(12) United States Patent
Lory et al.

(10) Patent No.: US 6,536,575 B1
(45) Date of Patent: Mar. 25, 2003

(54) CLUTCH DISK FOR A MOTOR VEHICLE FRICTION CLUTCH

(75) Inventors: Mario Lory, Sennfeld (DE); Klaus Dollhopf, Schweinfurt (DE); Achim Link, Schweinfurt (DE); Reinhard Feldhaus, Ebenhausen (DE); Bernhard Schierling, Kürnach (DE); Norbert Ament, Oerlenbach-Eltingshausen (DE); Jürgen Kleifges, Schweinfurt (DE); Erwin Wack, Niederwerrn (DE); Jürgen Weth, Niederwerrn (DE); Bernd Peinemann, Niederwerrn (DE); Andreas Orlamünder, Schweinfurt (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/624,759

(22) Filed: Jul. 24, 2000

Related U.S. Application Data

(62) Division of application No. 09/356,941, filed on Jul. 19, 1999, now abandoned.

(30) Foreign Application Priority Data

Jul. 17, 1998 (DE) .......................................... 198 32 136
Jan. 14, 1999 (DE) .......................................... 199 01 043
Jun. 10, 1999 (DE) .......................................... 199 26 382

(51) Int. Cl.$^7$ ............................................... F16D 13/68
(52) U.S. Cl. ....................................... 192/212; 192/200
(58) Field of Search ................................ 192/52.3, 52.6, 192/107 C, 30 V, 70.17, 200, 212

(56) References Cited

U.S. PATENT DOCUMENTS

| | | | | |
|---|---|---|---|---|
| 1,571,746 A | | 2/1926 | Wemp | |
| 1,942,677 A | * | 1/1934 | Wood | 192/212 |
| 2,281,898 A | | 5/1942 | Whitten | |
| 2,571,291 A | * | 10/1951 | Reed | 192/212 |
| 4,212,380 A | * | 7/1980 | Billet | 192/213.22 |
| 4,993,530 A | * | 2/1991 | Maki | 192/70.17 |
| 5,617,939 A | * | 4/1997 | Memmel et al. | 192/204 |
| 5,984,073 A | * | 11/1999 | Lohaus et al. | 192/70.17 |
| 6,293,870 B1 | * | 9/2001 | Nagano et al. | 192/210 |

FOREIGN PATENT DOCUMENTS

| | | |
|---|---|---|
| DE | 43 22 578 | 1/1994 |
| DE | 44 16 949 | 9/1995 |
| FR | 1 389 259 | 1/1965 |
| FR | 2 420 056 | 10/1979 |
| FR | 2 724 995 | 3/1996 |
| GB | 2 037 944 | 7/1980 |
| GB | 2 269 641 | 2/1994 |
| GB | 2 271 154 | 4/1994 |
| GB | 2 272 030 | 5/1994 |
| GB | 2 335 956 | 10/1999 |

\* cited by examiner

*Primary Examiner*—Rodney H. Bonck
(74) *Attorney, Agent, or Firm*—Cohen, Pontani, Lieberman & Pavane

(57) ABSTRACT

A clutch disk is provided having a connecting arrangement, by means of which the friction linings can execute a radial movement with respect to the hub rotation axis and/or tilting movement with respect to a plane orthogonal to the hub rotation axis.

3 Claims, 14 Drawing Sheets

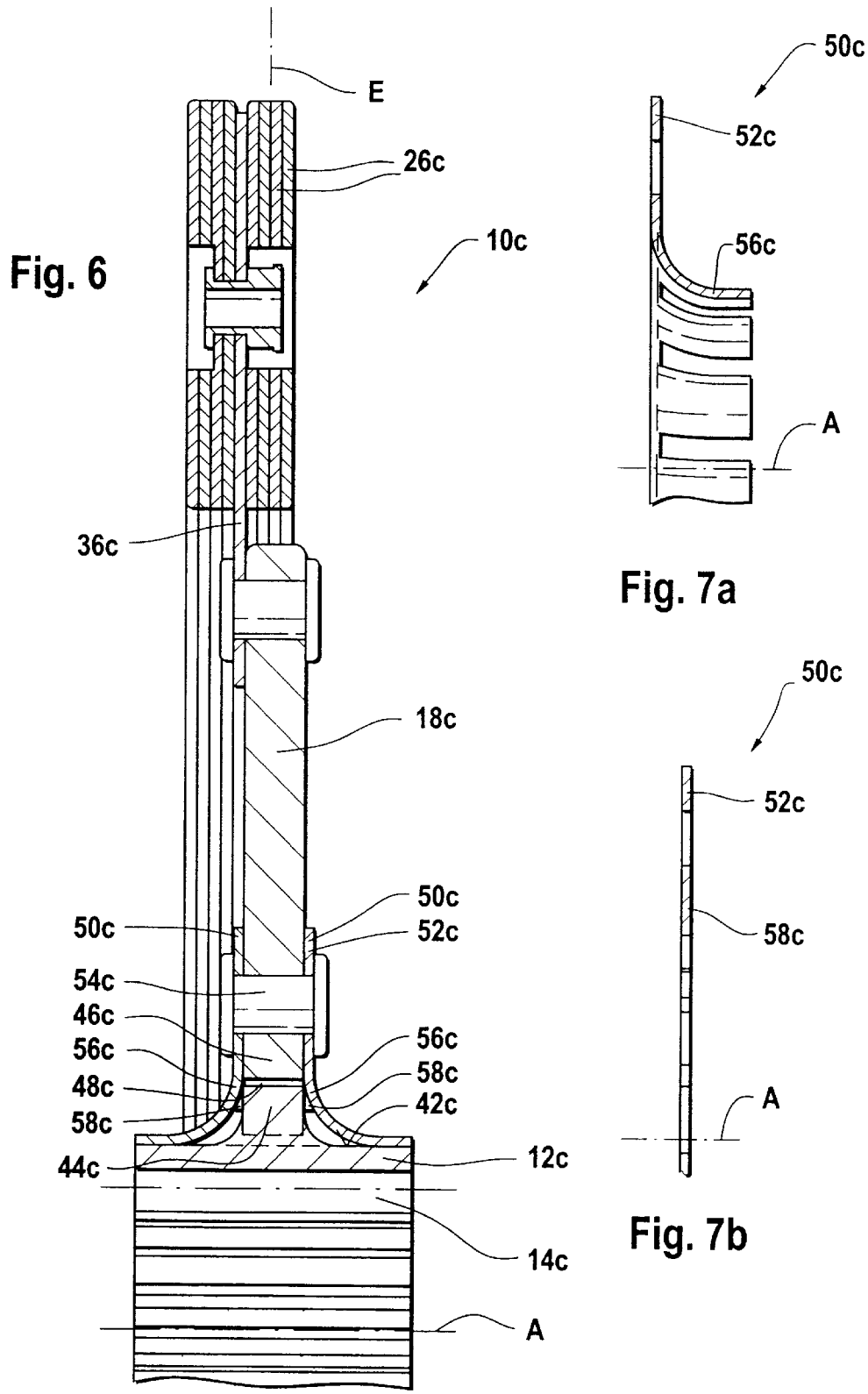

Fig. 22
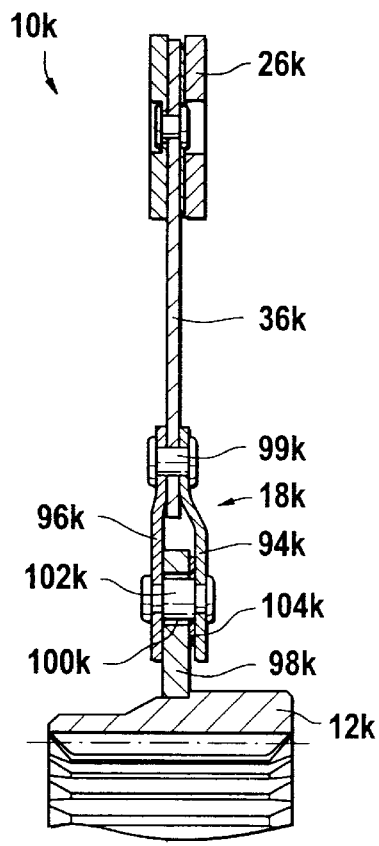
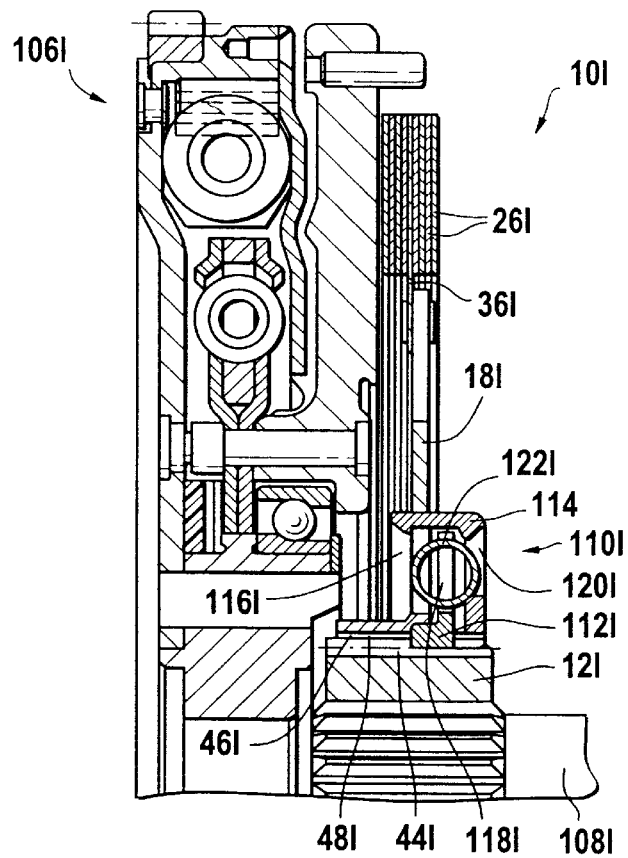
Fig. 23

CLUTCH DISK FOR A MOTOR VEHICLE FRICTION CLUTCH

This is a division continuation-in-part of U.S. application Ser. No. 09/356,941, filed Jul. 19, 1999, now abandoned.

BACKGROUND OF THE INVENTION

1. Field of the Invention

The present invention relates to a clutch disk for a motor vehicle friction clutch, having a hub couplable fixedly in terms of rotation to a transmission input shaft. Friction linings are provided in a radially outer region of the clutch disk. The friction linings lie, at least partially, essentially parallel to, or in one plane which is essentially orthogonal to, a hub rotation axis. The clutch further has a connecting arrangement, by means of which the friction linings of the clutch disk are connected to the hub so that the friction linings can execute a radial movement with respect to the hub rotation axis and/or a tilting movement with respect to the plane.

2. Description of the Prior Art

In vehicle construction, there is often the problem, where transversely installed drive assemblies are concerned, that a transmission input shaft is no longer mounted in a pilot bearing in the crankshaft and is therefore no longer centered with respect to the crankshaft. The result of this is that slight axial offsets and wobbling movements may occur during operation, which are induced by the untrue running of the crankshaft or of the flywheel fixed to the crankshaft.

When rigid clutch disks are used, in which the friction linings are coupled essentially rigidly to the hub of the clutch disk, the axial offset or the wobbling movement often gives rise to the problem of excessive wear in the region of the hub profile or of the transmission input shaft profile, or there is the problem that the welding or caulking between the hub and the driving disk carrying the friction linings fractures. Furthermore, the bearings, for example in the dual-mass flywheel and in the transmission, are subjected to greater load, and often there is poor vibration uncoupling which may lead to changing idling states.

German reference DE 43 22 578 A1 discloses a clutch disk in which a driving disk with an internal toothing is received on an external toothing of the hub of the clutch disk so that limited radial displaceability or relative rotation becomes possible between these two parts. Furthermore, the driving disk has arranged on it a spring element which presses against a bearing element supported on the hub and which thus causes the driving disk to be centered with respect to the hub.

German reference DE 44 16 949 C1 discloses a wobblable clutch disk in which the friction linings, that is to say lining springs of the latter, are connected to the clutch hub via a plurality of leaf-spring elements running essentially tangentially to the clutch hub.

Furthermore, French reference FR-A-27 24 995 discloses a clutch disk in which the lining carriers are fixed to the driving disk via bolts. The bolts are pivotable with respect to the driving disk by the interposition of elastic elements so that corresponding pivotability or displaceability of the lining carriers becomes possible.

SUMMARY OF THE INVENTION

The object of the present invention is to provide a clutch disk in which wobbling movements or axial offsets occurring during operation can be balanced out or compensated in a reliable way. According to a first embodiment of the present invention, this object is achieved in that, in a generic clutch disk, the connecting arrangement comprises a driving disk which is coupled essentially fixedly in terms of rotation to the hub, on the one hand, and the friction linings, on the other hand, and which, in a region radially between the coupling to the hub and the coupling to the friction linings, has at least one deformation region running in the axial direction or bent toward the axial direction.

Elasticity, which reliably and effectively permits wobbling movements and compensates axial offsets, is integrated into the clutch disk by the provision of this deformation region extending or bent in the axial direction.

This effect may be reinforced, particularly when the deformation region comprises a plurality of bend regions which provide an axially serpentine contouring running from radially inward to radially outward.

An easily practicable adaption of the clutch disks according to the invention to various requirements, that is to say the provision of various elasticities, may be implemented in a simple way, in that the driving disk has a radially inner annular region for coupling to the hub, a radially outer annular region for coupling to the friction linings and a plurality of connecting portions, and in that the deformation region is provided in each case in the region of the connecting portions. It is also advantageous, here, that weight can be saved by the provision of cutouts in the region of the driving disk.

Alternatively, however, it is also possible for the disk part to be an essentially completely closed diaphragm-like disk part. In this case, to, the elasticity can be selected by the choice of material, on the one hand, and by the special design of the meander-like structure, on the other hand.

The connecting portions may extend essentially radially.

According to a further independent aspect of the invention, there is provision for the connecting arrangement to comprise a disk part with a radially inner annular portion, a radially outer annular portion and a plurality of connecting portions. The connecting portions are bent from radially inward to radially outward and in at least one circumferential direction. Bending in the circumferential direction also allows highly constraint-free tilting or displacement in the radial direction, so that wobbling movements and axial offsets can be compensated.

Of course, it is also possible to combine this aspect with the previously specified aspects via the provision of three-dimensionally bent connecting portions.

Preferably, in this case, the connecting portions are approximately S-shaped.

According to a further embodiment of the present invention, the foregoing object can be achieved in that the connecting device comprises a driving disk which radially outwardly is coupled to the friction linings and radially has an internal toothing which meshes with an external toothing on the hub, radial movement play being provided. The device furthermore comprises a centering spring arrangement by means of which the driving disk is centered elastically with respect to the hub. A particularly simple design may be obtained, in this case, if the centering spring arrangement comprises at least one angularly designed centering spring portion which is supported on an outer circumferential surface of the hub.

In this case, there may, for example, be provision for the at least one angularly designed centering spring portion to be provided by at least one essentially ring-like spring part which has, on an inner circumferential region, a plurality of spring tabs which are bent in the direction of the hub rotation axis so as to bear on the outer surface of the clutch hub.

So that the axial securing function, in addition to radial centering, can also be integrated into the clutch disk in a simple way, in another embodiment that at least one spring part has at least one axial securing projection supported axially on a radial projection of the hub, preferably in the region of the external toothing.

Preferably, a spring part is arranged on each of the two axial sides of the driving disk.

The design may be simplified further and the number of parts reduced if the at least one spring part is designed integrally with the driving disk and forms a radially inner region of the latter.

In an alternative embodiment, the centering spring arrangement comprises at least one spring part fixed to one component, either the hub or the driving disk, which engages axially with at least one spring tab into an interspace formed between the internal toothing and the external toothing and which is supported under prestress on the other component. Since, in this case, the individual spring tabs engage into the region of the toothing, an embodiment which is axially extremely short is produced.

Here too, it is advantageous for the distribution of forces if a spring part is arranged on each side of the one component and the spring parts engage alternately from each of the two axial sides into an interspace between the external toothing and the internal toothing.

Furthermore, the at least one spring part may comprise at least one radially inward-projecting axial securing portion supported axially on the hub, preferably on the external toothing of the latter.

According to a further independent aspect, the object according to the invention is achieved in that the connecting arrangement comprises: an intermediate disk which is coupled to the hub for joint rotation and is displaceable with respect to the hub essentially radially to the hub rotation axis in a first direction of displacement. A driving disk is provided which, on the one hand, is coupled to the friction linings and, on the other hand, is coupled to the intermediate disk for joint rotation and is displaceable with respect to the intermediate disk essentially radially to the hub rotation axis in a second direction of displacement. The first direction of displacement and the second direction of displacement are different directions of displacement. A cardan-like coupling between the friction linings and the hub is provided here, which allows constraint-free and deformation-free radial displacement of the friction linings with respect to the hub. At the same time, preferably, the first direction of displacement is essentially orthogonal to the second direction of displacement.

This cardan-like coupling is provided, for example, in a clutch disk which comprises: at least one essentially radially extending for driving projection on one component, either the hub or the intermediate ring, and, on the other component, either the intermediate ring or the hub, so as to be assigned to each first driving projection, in each case an essentially radially extending first driving recess receiving the associated first driving projection with radial movement play. Additionally, on one component, either the intermediate disk or the driving disk, at least one essentially radially extending second driving projection is provided and, on the other component, either the driving disk or the intermediate disk, so as to be assigned to each second driving projection, in each case an essentially radially extending second driving recess is provided for receiving the associated second driving projection with radial movement play.

In this embodiment, too, it is advantageous, for unimpeded execution of the radial movement in any desired direction, if the at least one first driving projection and the at least one second driving projection are offset at approximately 90° to one another in the circumferential direction.

According to a further independent aspect, the foregoing object is achieved in that the connecting arrangement comprises a radially projecting hub flange connected fixedly in terms of rotation to the hub. A driving disk is provided which radially outwardly is coupled to the friction linings and radially inwardly comprises two connecting portions, in each case a connecting portion being provided, at least in regions, on one axial side of the hub flange. A plurality of connecting bolts connect the connecting portions in each case to the hub flange for joint rotation, but allow radial relative movement and circumferential relative movement between the connecting portions, on the one hand, and the hub flange, on the other hand, to a predetermined extent. Between at least one of the connecting portions and the hub flange, an elastically deformable arrangement, preferably elastomeric material layer, is received under prestress.

In this case, there may, for example, be provision for the connecting bolts to be fixed with respect to the connecting portions or to the hub flange and to be displaceable in the radial and circumferential directions with respect to the other subassembly in each case. The deflection movement or displacement movement of the friction linings with respect to the hub, made possible by the elastically, may be further improved or made easier in that an elastically deformable arrangement is provided between the two connecting portions and the respectively associated axial side of the hub flange.

According to a further independent aspect of the present invention, the foregoing object is achieved in that the connecting arrangement comprises a torosional vibration damper arranged in the torque transmission path between the hub and the friction linings and having an input side and an output side. The input side and the output side are displaceable in the radial direction and/or axial direction with respect to one another and/or at least one of the sides, either the input side or the output side, being tiltable with respect to the plane and to the other side. In this case, advantageously, the torsional vibration damper, on the one hand, is utilized, for example, for damping torsional vibrations occurring in the idling speed range and, on the other hand, is utilized for providing the necessary movement play for the components movable relative to one another when wobbling movements or axial offsets occur. It is obvious that, if a torsional vibration damper is provided, the component regions coupled by means of the latter are also displaceable in the circumferential direction with respect to one another in order to perform the torsional vibration damping function. In this case, the relative movability in the radial direction and/or the axial direction then serves essentially to make a wobbling movement possible, and, at the same time, this radial displacement or axial displacement when torsion vibrations occur may also take place while a relative circumferential movement of the component groups is being executed. It may be pointed out that, here, insofar as an input side or an output side is referred to, this relates, for example, to the force flow or torque flow in the driving state of a drive assembly. It is obvious that, in the overrun mode, the functional assignment of the input side and output side to specific component groups may be reversed.

An embodiment of this kind may be implemented, for example, with a connecting arrangement which comprises a driving disk which is received by means of an internal toothing, with radial movement play and circumferential movement play, on an external toothing of the hub. A torsional vibration damper hub flange is coupled fixedly in terms of rotation to the hub. A spring arrangement with at least one spring extends approximately in the circumferential direction and is supported, in its end regions, on respective control edges of the torsional vibration damper hub flange, on the one hand, and of the driving disk, on the other hand. The at least one spring is displaceable in the region of support on the respective control edge of the driving disk and/or in the region of support on the respective control edge of the torsional vibration damper hub flange, with respect to the respective control edge, at least in the approximately radial direction of extent of the associated control edge.

Alternatively, it is possible for the connecting arrangement to comprise a driving disk with a radially outer disk part and with a radially inner disk part. The radially outer disk part has an internal toothing which meshes with an external toothing on the radially inner disk part with relative movement play in the radial direction and in the circumferential direction. The torsional vibration damper comprises a spring arrangement with at least one spring which is arranged in the region of the intermeshing toothings and which can be supported in its end regions on the external toothing, on the one hand, and the internal toothing, on the other hand. An arrangement which is axially very short is thereby produced, once again, which leaves increased construction space for other components or results in a general reduction in the construction space requirement for a friction clutch designed with a clutch disk of this type. In this case, preferably, the torsional vibration damper is arranged in the radially outer region of the driving disk.

Furthermore, radial displaceability and/or wobbling movability may be made possible solely or additionally by means of the elastic deformation of a coupling arrangement coupling the input side and the output side.

In this case, there may, for example, be provision for the input side to comprise a driving disk with internal toothing and for the output side to comprise cover disks which are arranged on both sides of the driving disk and which are connected fixedly in terms of rotation to the hub, the hub having an external toothing assigned to the internal toothing. In this case, there is preferably provision for coordinating the internal toothing of the driving disk and the external toothing of the hub with one another, in such a way that the driving disk and the hub are displaceable with respect to one another in the circumferential direction, in the radial direction and in the axial direction.

According to a further alternative embodiment, but one which can be combined readily with other embodiments according to the invention of an elastically coupling clutch disk, the connecting arrangement comprises a bellows-type coupling arrangement. It has been shown that, particularly in the case of torque transmission with axial offset and/or axial inclination, bellows-type coupling arrangements of this kind perform wear-free compensation of these axial errors and, moreover, have the advantage of extremely low mass.

In this case, for example, the bellows-type coupling arrangement comprises at least one coupling bellows which extends essentially in the direction of the hub rotation axis and which, in a first end region, is coupled to the hub and, in a second end region, is coupled to the friction linings. For example, the bellows-type coupling arrangement may comprise a metal coupling bellows.

The various features of novelty which characterize the invention are pointed out with particularly in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

FIG. 6 shows a part view in longitudinal section of a further clutch disk according to the invention;

FIGS. 7a and b show in each case views in longitudinal section in various circumferential regions of the spring parts illustrated in FIG. 6;

FIG. 22 shows a longitudinal section of a further alternative embodiment of a clutch disk according to the invention;

FIG. 23 shows still a further alternative embodiment of a clutch disk according to the invention;

FIG. 26b shows an axial view of the clutch disk of FIG. 26a; and

DETAILED DESCRIPTION OF THE PREFERRED EMBODIMENTS

Figure 1:
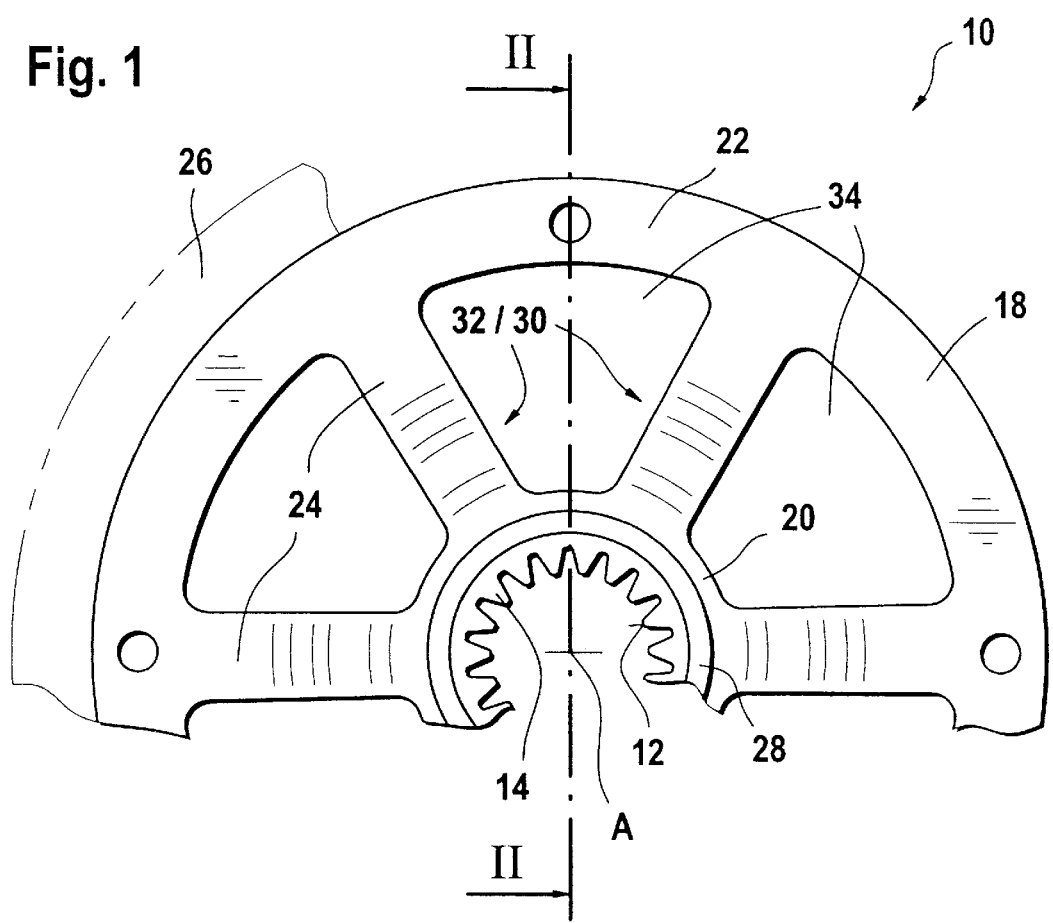
FIG. 1 shows a diagrammatic partial axial view of a driving disk of a clutch disk according to the invention, said driving disk being connected to a hub.
Figure 2:
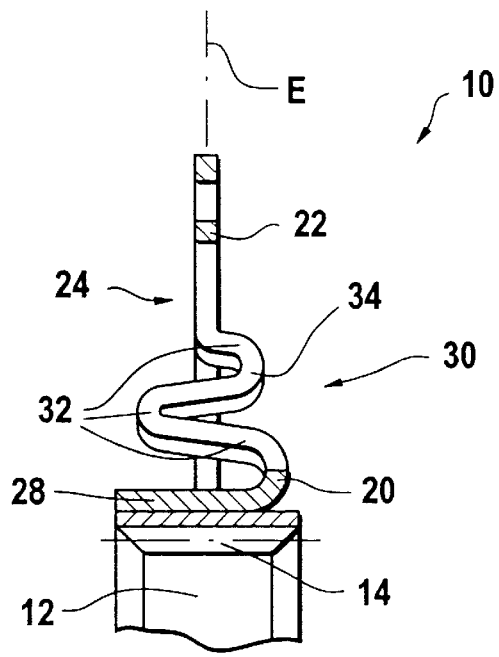
FIG. 2 shows a section through the arrangement illustrated in FIG. 1, along a line II—II.

FIGS. 1 and 2 show a first embodiment of a clutch disk according to the invention. This clutch disk 10 comprises a hub 12 which can be coupled via an internal toothing 14 to an external toothing on a transmission input shaft, not illustrated, for joint rotation. The clutch disk 10 comprises, furthermore, a driving disk 18 which, in the embodiment illustrated, comprises an inner annular portion 20, an outer annular portion 22 and a plurality of connecting portions 24 connecting these annular portions 20, 22. The outer annular portion 22 is coupled to merely diagrammatically indicated friction linings 26 of the clutch disk either directly or with lining springs or the like being interposed.

As is apparent particularly from FIG. 2, in the region of the inner annular portion 20, the driving disk 18 is designed with a cylindrical portion 28 which surrounds an outer circumferential surface of the hub 12 and which is fixedly connected to the latter, for example by the formation of a longitudinal interference fit, by welding, by riveting or by any other suitable types of connection. Each connecting portion 24 has formed on it, in a middle region, a deformation region 30 which has a plurality of bends 32, so that the serpentine profiling apparent in FIG. 2, with portions bent or running in the axial direction, is produced. By the provision of these deformation regions 30, the driving disk 18 can be deformed elastically, so that radial movement between the radially inner region of the driving disk 18, that is to say the inner annular region 20 fixedly connected to the hub 12, and the radially outer region of said driving disk, that is to say the outer annular portion 22 fixedly connected to the friction linings 26, can occur both in the radial direction and with the effect of executing tilting or wobbling movements. Slight axial offsets prevalent between a crankshaft or an internal combustion engine, not illustrated, and a transmission input shaft can thus be compensated, during operation, as a result of the elastic displaceability of the radially inner region with respect to the radially outer region of the clutch disk. Wobbling movements occurring during operation, which are induced by untrue running of the crankshaft and/or of the transmission input shaft, can also be compensated by means of the elastic deformability.

In this case, the elasticity may be set by the width of the individual connecting portions 24 and by the number and shape of the portions which are axially bent or bent in the axial direction. The orifices 34, apparent in FIG. 1, between the individual connecting portions 24 make it possible to apply a tool, by means of which a clutch of modular design can be screwed to a crankshaft flange. It is also possible, however, for the driving disk 18 to be designed continuously in the circumferential direction in the manner of a diaphragm.

The driving disk 18 is preferably stamped from a sheet-metal part and is bent into the required shape by means of suitable tools.

It is possible, furthermore, that the connecting portions 24, illustrated as extending radially in FIG. 1, have a circumferential extent component, so that elasticities are additionally integrated into the driving disk 18 here.

In the remaining illustrated embodiments, lower case letters, i.e., "a", will be used in conjunction with the reference numerals to distinguish the embodiments from one another.

Figure 3:
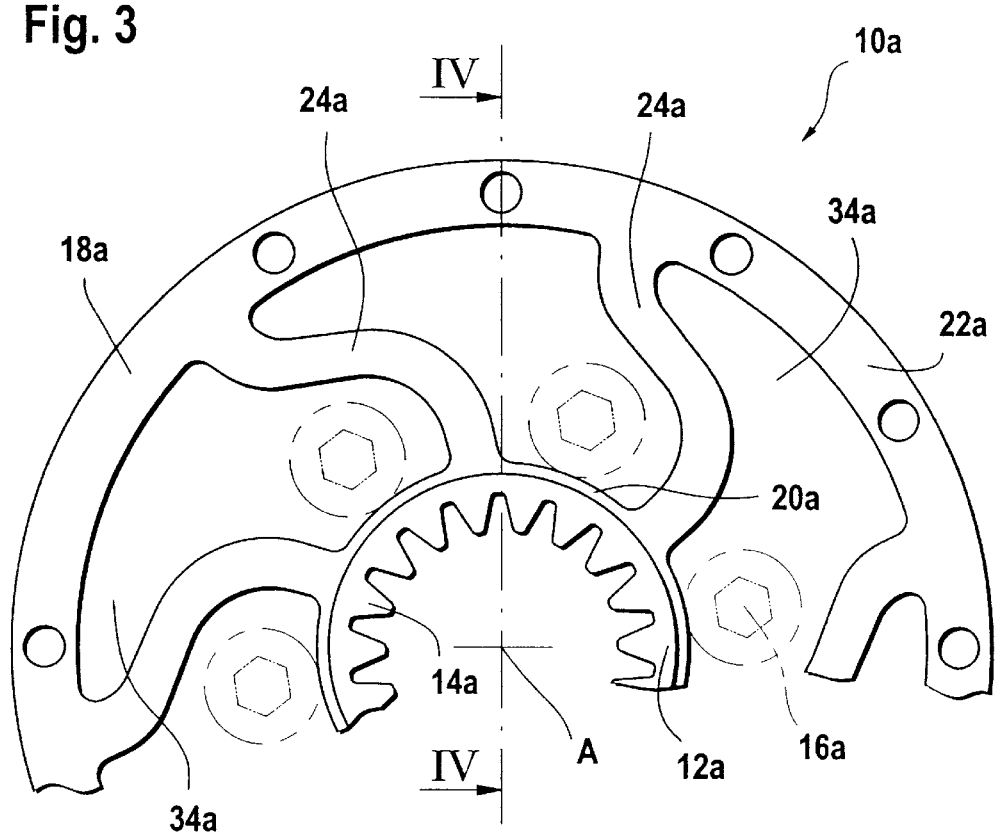
FIG. 3 shows a view, corresponding to that of FIG. 1, of an alternative embodiment of the driving disk.
Figure 4:
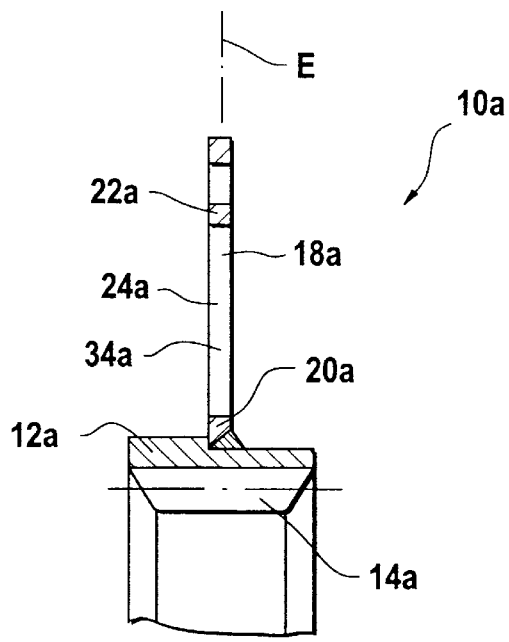
FIG. 4 shows a sectional view along a line IV—IV in FIG. 3.

FIGS. 3 and 4 show a modification of the embodiment illustrated in FIG. 1, once again an inner annular portion 20a, an outer annular portion 22a and a plurality of connecting portions 24a for forming a driving disk 18a are provided. As may be seen in FIG. 4, the driving disk 18a lies approximately in a plane E orthogonal to the rotation axis A of the clutch disk 10a and does not have the portions projecting out of the plane E in the axial direction, as does the embodiment according to FIGS. 1 and 2. Instead, the individual connecting portions 24a extend in the circumferential direction from radially inward to radially outward so that, here too, the elastic deformation of the connecting portions 24a makes it possible for the outer annular portion 22a to tilt with respect to the inner portion 20a, that is to say, for example, out of the plane E. This elasticity is further improved by the winding, slightly S-shaped form of the connecting portions 24a.

It is apparent from FIG. 4 that an embodiment in which the driving disk 18a is welded to the hub 12a is selected. The orifices 34a can also be seen again, through which access is gained to screws 16a, illustrated diagrammatically, by means of which a flywheel can be screwed to a crankshaft.

It may be pointed out that the connecting portions 24a can assume various shapes; thus, for example, an embodiment is also possible, in which they have a serpentine or S-like shape from radially inward to radially outward, as illustrated in FIG. 2, but with serpentine or S-profiling in a circumferential direction, not in the axial direction. This, too, provides both elasticity for compensating an axial offset and elasticity for allowing the wobbling movement.

Figure 5:
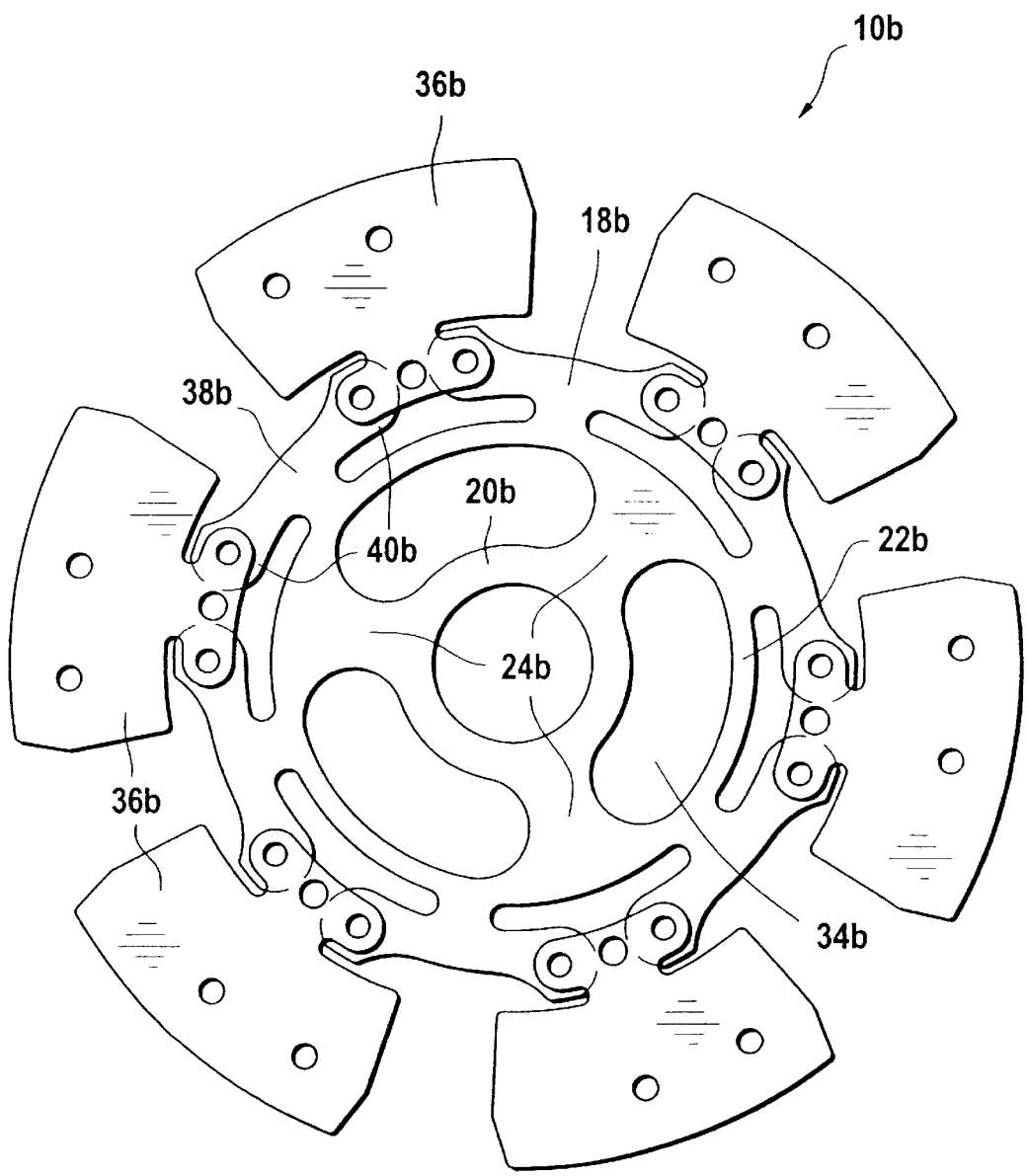
FIG. 5 shows an axial view of another embodiment of the driving disk.

FIG. 5 shows a further modification of the elastically deformable driving disk 18b which, once again, has an inner annular portion 20b, an outer annular portion 22b and a plurality of connecting portions 24b which connect these annular portions and which, again, extend radially in the embodiment illustrated. The outer annular portion 22b has adjoining it a plurality of T-shaped lining spring carriers 38b which are in each case connected in their free T-shaped end regions, 40b to lining springs or lining carriers 36b. Here too, as seen from radially inward to radially outward, a profiling is produced which has a connecting-web extent component in the circumferential direction, for example at the transition from the connecting portion 24b into the outer annular portion 22b and then further into the T-shaped lining spring carrier 38b. In order to improve the elasticity even further here, it is possible to open the outer annular portion 22b in each case in the circumferential region between the individual connecting portions 24b, so that a noncontinuous outer annular portion is produced here; this is likewise possible in the embodiments according to FIGS. 1 to 4. The recesses 34b which can be seen may also be circular recesses which leave only very thin residual material thickness as webs, with the result that production by stamping tools is simplified.

It may be pointed out that it is also possible for a driving disk to be produced by a combination of the principles referred to above. That is to say, this driving disk may comprise connecting webs with both bend regions running in the axial direction and bend regions running in the circumferential direction, and if appropriate, the plurality of lining spring carriers 38b, which can be seen in FIG. 5, may then also be attached to the radially outer region, that is to say the outer annular portion 22, and the friction linings may likewise be attached directly to said lining spring carriers 38b, with the lining springs 36b being omitted.

The embodiment of a clutch disk or of a driving disk, as illustrated in FIGS. 1 to 5, has the advantage that the possibility of the wobbling and radial movement can be integrated into a clutch disk in an extremely simple and cost-effective way from favorable materials. Since there are no parts which rub against one another during operation, the occurrence of frictional wear is ruled out. Furthermore, the simple design provides a highly spaced-saving embodiment.

FIGS. 6 and 7 show a further embodiment of a clutch disk 10c according to the invention. Once again, the clutch disk 10c has the hub 12c with the internal toothing 14c. The hub 12c has on its outer surface 42c an external toothing 44c. The driving disk 18c is designed, here, as a solid structural part which carries the friction linings 26c radially outwardly via the lining springs or other lining carriers 36c. The driving disk 18c has an internal toothing 46c which meshes with the external toothing 44c, in such a way that there is a radial interspace 48c which allows a slight radial relative movement between the driving disk 18c and the hub 12c.

Provided on the driving disk 18c, on both sides, are annular spring parts 50c having a radial outer continuous annular region 52c, by means of which the spring parts 50c are fixed to the driving disk 18c by means of fastening bolts 54c. The spring parts 50c have, in their radially inner regions, a plurality of tabs 56c, 58c separated by slots running radially. The tabs 56c, 58c in each case alternate with one another in the circumferential direction. The tabs 56c are longer and are bent in the axial direction, so that they rest under prestress on the outer surface 42c of the hub 12c. The tabs 58c are shorter and extend radially inward only to an extent such that they do not stand up on the outer surface 42c of the hub 12c, but simply clamp the external toothing 44c of the hub 12c between them. Thus, on the one hand, radial centering between the hub 12c and the driving disk 18c is formed by the tabs 56c pressing against the outer surface 42c of the hub 12c in a circumferentially distributed manner and, on the other hand, axial centering or retention of the driving disk 18c on the hub 12c is provided by the tabs 58c. If wobbling movements occur or there is an axial offset, the driving disk 18c can be displaced, or else tilt out of the plane E, with respect to the hub 12c by virtue of the interspace 48c present between the toothings 44c, 46c. For this purpose, the individual toothings may have a convex design.

When the interspace also present in the circumferential direction between the toothings 44c, 46c is used up, a torque transmission connection between these structural parts is provided.

In order to avoid extraneous friction and tilting influences, the driving disk 18c is preferably arranged centrally above the transmission input shaft profile, that is to say the internal toothing 14c, and the spring parts 50c are preferably designed identically on the left and right in terms of their radial centering forces. For example, the spring parts 50c may consist of spring steel. Centering may be direct or indirect, that is to say the spring parts 50c may press directly against the outer surface 42c of the hub 12c or a bearing element may be arranged between them, which is formed, for example, from a material having a low coefficient of friction, for example plastic. It is also possible to provide the individual spring parts 50c and/or the hub 12c with a coating completely or only in their region of mutual bearing contact, so as to ensure, between these structural parts, a desired coefficient of friction which, on the one hand, provides a reduction in the possible wear, and on the other hand, keeps the frictional conditions constant over the lifetime of the clutch disk 10c. It is advantageous that centering in the radial direction and centering in the axial direction are provided by the same structural parts, that is to say the spring parts 50c, so that there is no need for any additional structural parts.

Figure 8:
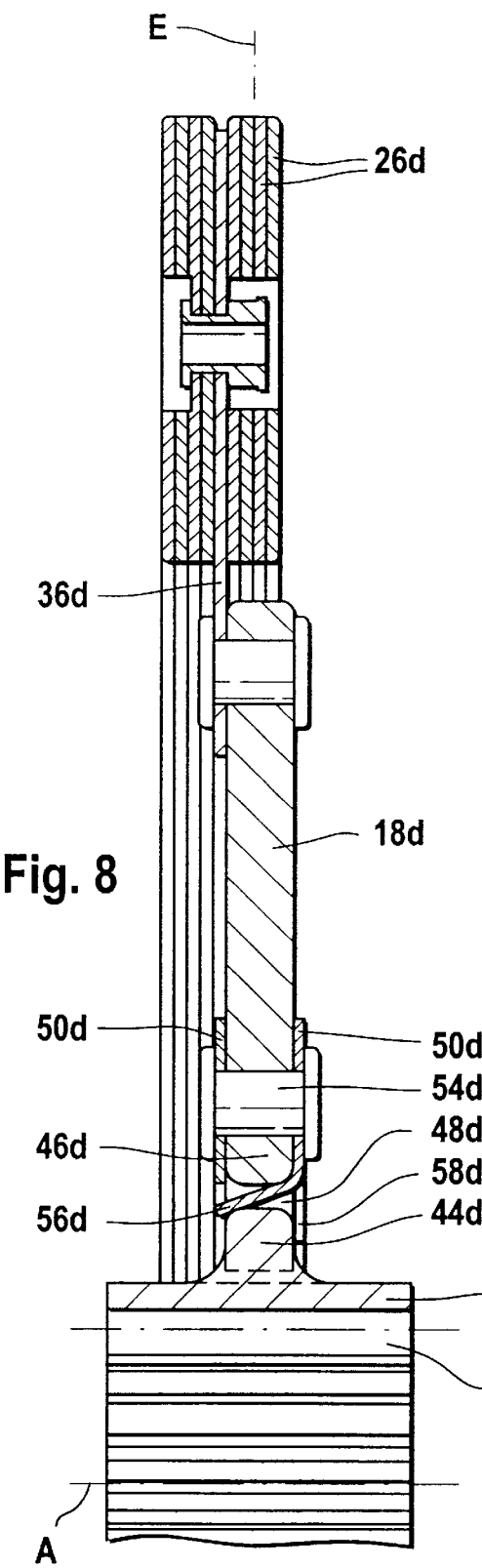
FIGS. 8 and 9 show a modification of the clutch disk illustrated in FIG. 6.
Figure 9:
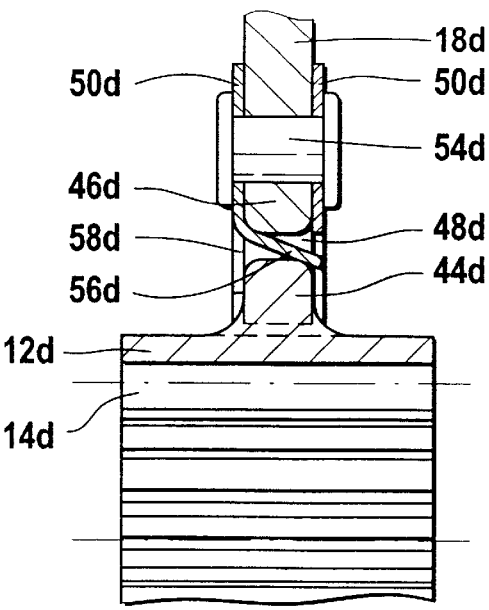
Figure 10A:
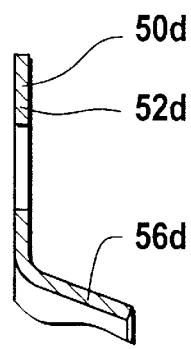
FIGS. 10a and b show in each case views corresponding to FIGS. 7a and b.
Figure 10B:
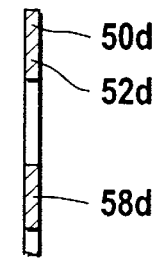

FIGS. 8 to 10 show a modification of this embodiment. In this embodiment, the tabs 56d of the spring parts 50d are bent in the axial direction toward the driving disk 18d and thus engage into the interspace 48d between the teeth of the external toothing 44d and the internal toothing 46b. The bent tabs 56d and the straight tabs 58d are provided on each of the spring parts 50d and alternate in the circumferential direction. For example, FIG. 8 shows a section taken in a plane, in which the tab 56d can be seen as projecting into the interspace 48d and, behind said tab in the circumferential direction, a tab 58d extends radially into the region of the inner toothing 44d. In the region of the tab 56d of the spring part 50d located on the right in FIG. 8, the spring part 50d located on the left in FIG. 8 does not have a tab, in order to allow the tab 56b of the right spring part to pass through. A tab 56d of the left spring part 50d then engages, offset in the circumferential direction (illustrated in FIG. 9), into the interspace 48d, and a tab 58d of the same spring part 50d projects radially inward into the region of the toothing 44d. Alternating engagement, distributed in the circumferential direction, into the interspaces 48d from the two axial sides is thus provided. For example, an embodiment may also be envisaged, in which, where a tab 56d of one spring part 50d engages into the interspace 48d, a tab 58d of the other spring part 50d extends radially inward on the other axial side.

By virtue of their spring elasticity, the individual tabs 56d bear under prestress on the internal toothing 44d, so that once again, on account of the uniform distribution in the circumferential direction, a centering force for the driving disk 18d with respect to the hub 12d is generated. Since the toothings 44d, 46d are of convex design, as illustrated, in addition to the purely radially directed relative movement it is also possible to have a tilting movement of the driving disk 18d and/or of the hub 12d out of the position aligned with the plane E.

Since, in this embodiment, the individual spring tabs 56d are braced very firmly, a highly progressive centering force is provided here.

Figure 11:
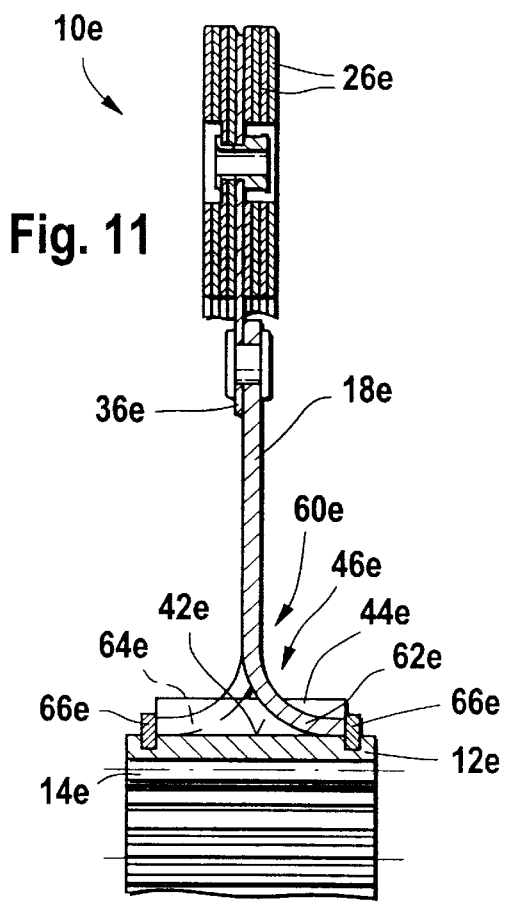
FIGS. 11 to 13 show in each case further modifications of the clutch disk shown in FIG. 6.
Figure 12:
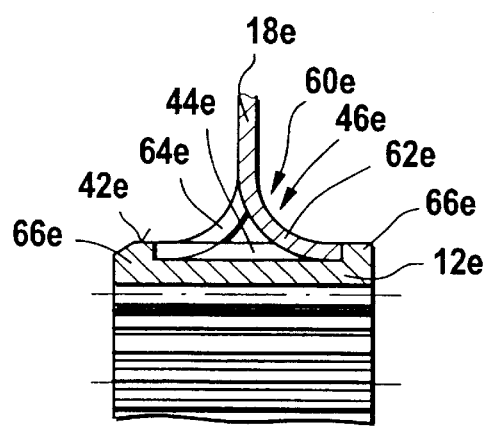

FIGS. 11 and 12 show a further modification of the clutch disk 10e according to the invention. It is apparent from FIG. 11 that the driving disk 18e has, in its radially inner region 60c, alternately bent tabs 62e, 64e which, as seen in a circumferential direction, are at a distance from one another corresponding to the toothing width of the external toothing 44c on the hub 12e. The alternately bent tabs 62e, 64e thus form the toothing themselves. The bend or the elasticity of the driving disk 18e in this radially inner region 60e may be produced, for example, by the slotting or other geometric weakening of the sheet-metal part which forms the driving disk 18e. The tabs 62e, 64e are in each case supported in the axial direction on securing rings 66e which are fixed in grooves on the hub 12e. The axial support of the tabs 62e, 64e and the constraint on them which is thereby generated further reinforce a centering effect which is produced by the bearing of said tabs on the outer surface 42e of the hub 12e.

By virtue of the uniform distribution of forces, the tabs 62e, 64e are preferably designed symmetrically and there is the same number of tabs on each axial side, so that a symmetrical embodiment is obtained. Here too, it is advantageous if the driving disk 18e is again located centrally above the toothing 14e of the hub 12e and if the tabs 62e, 64e are also designed identically in terms of their centering force.

In FIG. 12, the toothing 44e on the outer surface 42e of the hub 12e is produced by axially delimited indentations according one another in the circumferential direction, so as to form in the two axial end regions of these indentations, in each case between the teeth of the toothing 44e, wall regions 66e, on which the tabs 62e, 64e engaging between the individual teeth of the toothing 44e can be supported in the axial direction.

The surface pressure generated by the tabs 64e, 62e between the toothing 44e and the toothing 46e can be set to a desired dimension over the height of the toothing 44e, that is to say the radial extent of the teeth of the toothing 44e.

In the embodiment illustrated in FIGS. 11 and 12, the centering function both in the radial and in the axial direction and the elasticity to allow wobbling movements or to compensate an axial offset are integrated into the driving disk 18e which at the same time also makes the torque coupling with the hub 12e. A further saving in terms of structural parts can thus be achieved.

Figure 13:
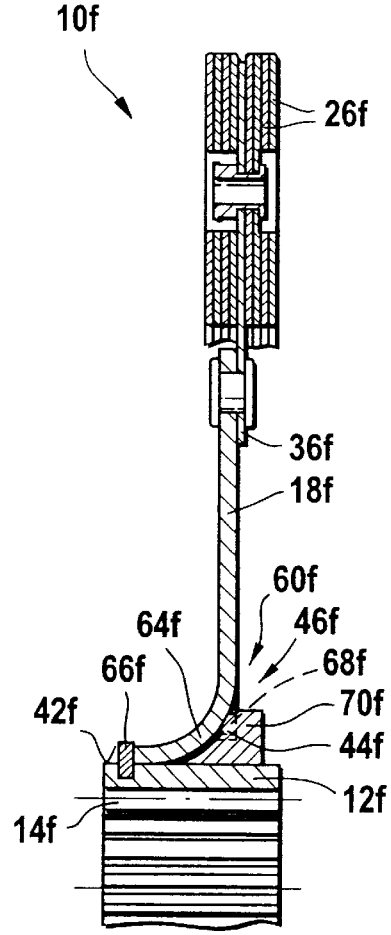

FIG. 13 shows a further modification of the clutch disk 10f, in which tabs 64f bent axially only to one side are present. The tabs bear on the outer surface 42f of the hub 12f and are supported axially on a securing element or projection 66f. Between the individual tabs 64f, which, here, do not form an integral part of the toothing 46f, there are individual radially extending projections 68f which alternate with the projections 64f in the circumferential direction and which thus form the teeth for the toothing 46f which mesh with the teeth of the toothing 44f. Furthermore, the teeth 68f are supported in the other axial direction on a radial projection 70f on the toothing 44f. It may be pointed out that, here too, another embodiment is possible, in which the tabs 64f form the teeth of the toothing 46f, which then engage between teeth of the toothing 44f, and in which the projections 68f serve merely for axial fixing by bearing on the projection 70f.

FIGS. 14 to 21 show a further embodiment of a clutch disk 10g according to the invention, in which relative movability between the clutch hub 12g and the friction linings 26g is made possible by a cardan-like connection.

Figure 14:
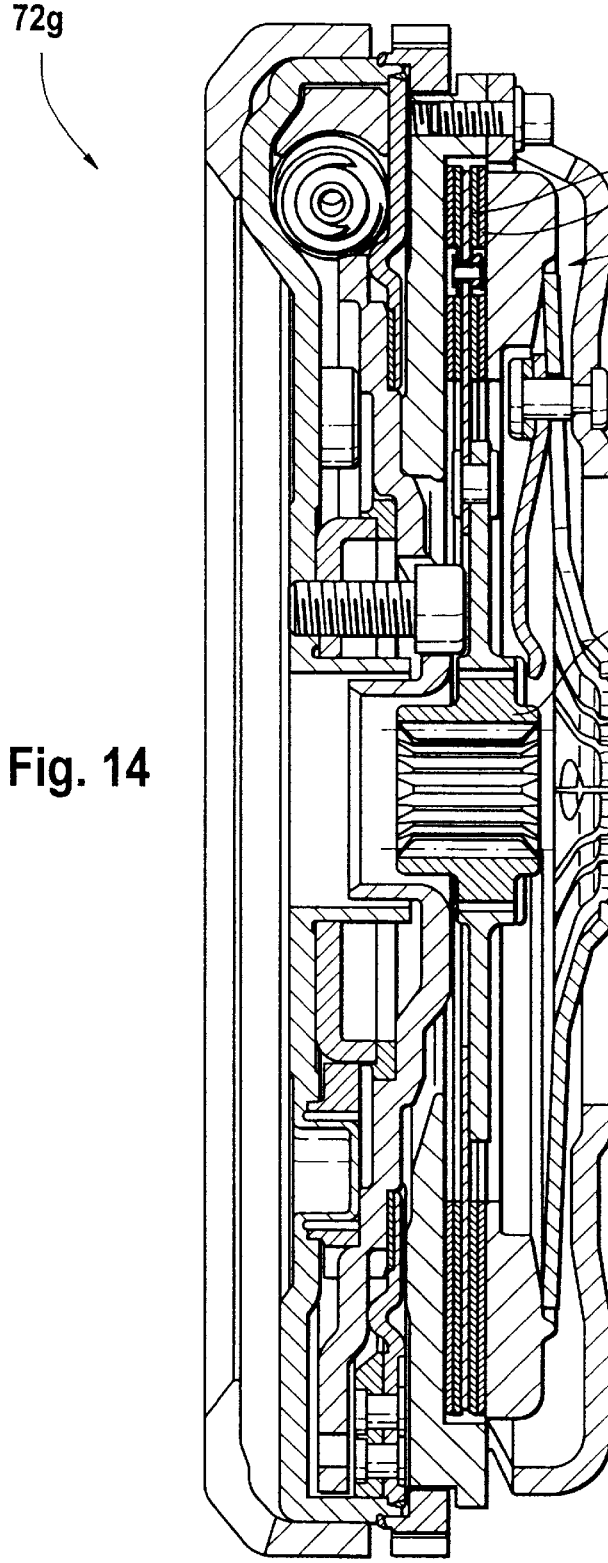
FIG. 14 shows a longitudinal section through a friction clutch which contains a clutch disk according to a further embodiment of the invention.
Figure 15:
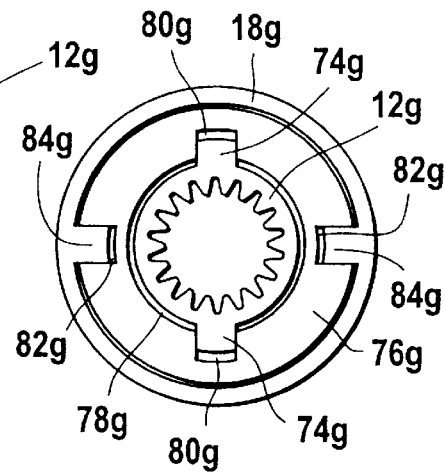
FIG. 15 shows an axial view of the relevant region of the clutch disk shown in FIG. 14.

In FIG. 14, the clutch disk 10g is illustrated as being integrated into a friction clutch 72g, the friction clutch 72g being of conventional design and a description of this being disregarded. FIG. 15 shows an axial view of that region of the clutch disk 10g in which a connection is made between the hub 12g and the radially outer driving disk 18g. It can be seen that the hub 12g has two driving projections 74g arranged at an angular distance of 180° and projecting radially outward. Arranged so as to surround the hub 12g is an intermediate disk 76g having a central orifice 78g which is larger than the outside diameter of the essentially circular hub 12g, so that movement play for the intermediate ring 76g is provided. Furthermore, the intermediate ring 76g has two driving recesses 80g which are likewise arranged at an angular distance of 180° and into which the driving projections 74g engage in each case, so that, in the illustration of FIG. 15, the intermediate disk 76g is movable upward and downward with respect to the hub 12g.

The intermediate disk 76g has, offset at 90° with respect to the driving recesses 80g, on its outer surface two further driving recesses 82g, into which driving projections 84g of the driving disk 18g engage in such a way that the driving disk 18g is displaceable in a direction from right to left, or vice versa, with respect to the intermediate disk 76g. This is also made possible by the fact that the driving disk 18g has a larger inside diameter than the outside diameter of the intermediate disk 76g. The superposition of these two displacement movements makes it possible to have any desired radial displacement of the friction linings 26g, which are again coupled to the driving disk 18g, with respect to the hub 12g.

It can be seen that the connecting region between the driving disk 18g and the hub 12g is located radially very far inward, so that the available construction space can be utilized optimally. It must be remembered, however, that, due to the small effective radii, the surface pressures occurring in the region of the driving projections and driving recesses engaging one into the other become very high. For axial fixing, for example, an elastomeric material may be vulcanized on, which holds in the axial direction the parts movable relative to one another and which at the same time provides the effect of a return into a centering position.

Figure 16:
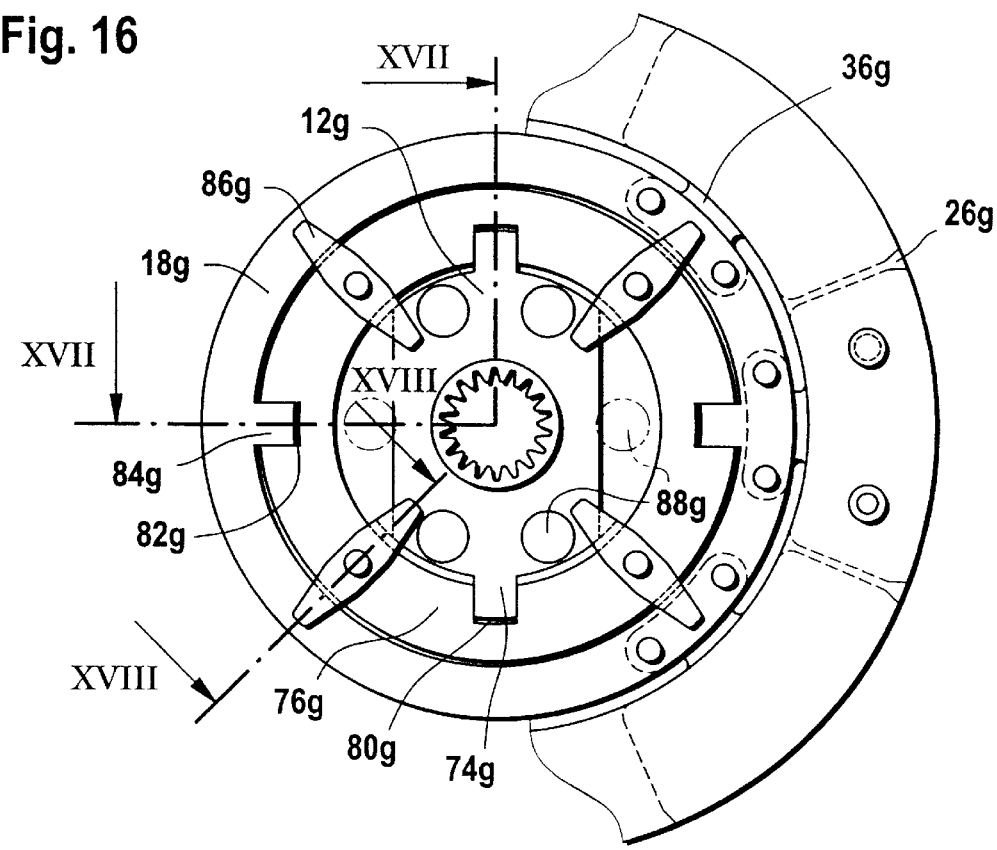
FIG. 16 shows an enlarged view corresponding to FIG. 15.
Figure 17:
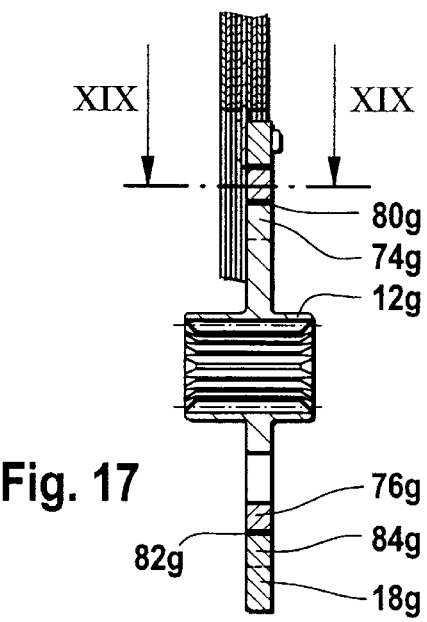
FIG. 17 shows a sectional view along a line XVII—XVII in FIG. 16.
Figure 18:
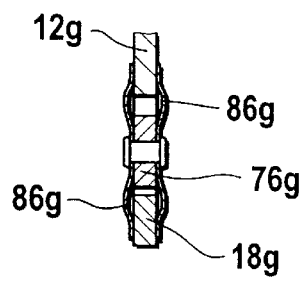
FIG. 18 shows a sectional view along a line XVIII—XVIII in FIG. 16.
Figure 19:
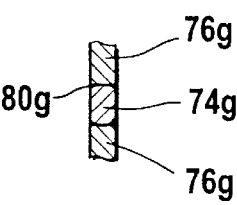
FIG. 19 shows a sectional view along a line XIX—XIX in FIG. 17.

In the embodiment according to FIGS. 16 and 17, the connection is displaced somewhat further radially outward, so that the surface pressure which occurs in the region of the projections and recesses engaging one into the other can be reduced. Axial fixing is brought about, here, by leaf-spring elements 86g which, as may be seen in FIG. 18, are riveted to the intermediate disk 76g and in each case press with free end regions against the driving disk 18g and the hub disk 12g respectively. Preferably, leaf-spring elements of this kind are provided on both axial sides, so that axial retention or centering is achieved in both directions. Furthermore, these springs 86g deliver a restoring moment when wobbling movements are executed. In order to make these wobbling movements easier, each of the projections 74g, 84g is provided with a convex structuring or surface formation, as shown in FIG. 19, in order to allow the individual components to tilt with respect to one another.

It can also be seen, in FIG. 16, that a plurality of passage orifices 88g are provided in the hub 12, to allow screws or tools to pass through. This makes it easier to assemble the structural unit consisting of the dual-mass flywheel, the pressure plate and the clutch disk.

Figure 20:
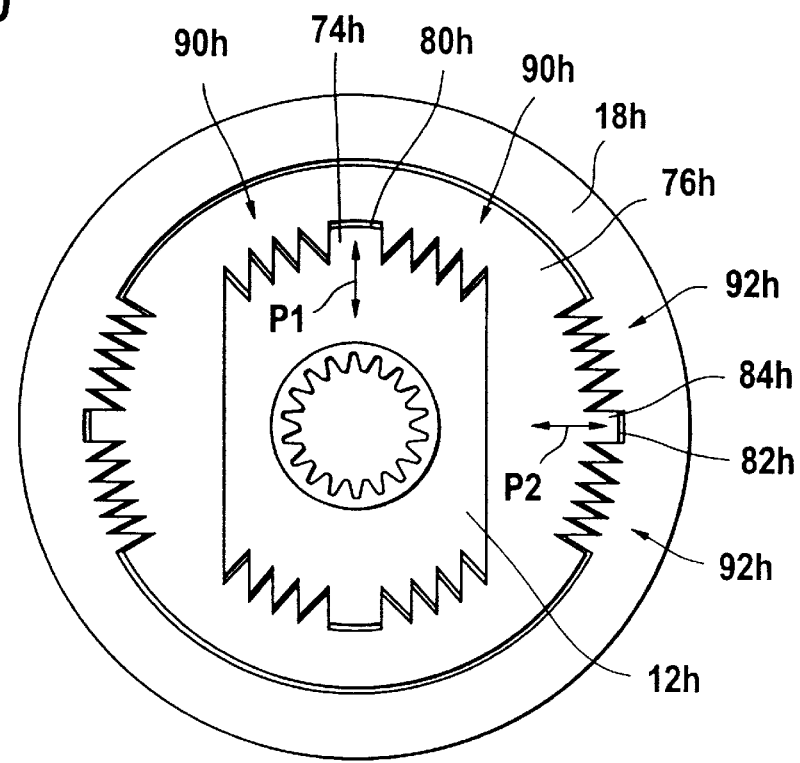
FIG. 20 shows a modification of the clutch disk shown in FIG. 16.

FIG. 20 shows an embodiment which corresponds to the embodiments described above and in which individual projections or recesses do not ensure circumferential driving or radial displaceability, but, instead, in addition to the individual projections 74h, 84h and the recesses 80h, 82h, toothing-like engagement arrangements 90h, 92h are formed in each case on both sides of the projections and the recesses, and surface pressure can be further reduced by means of these engagement arrangements. It is important that the toothing arrangements 90h, 92h are directed in such a way that they do not impede free movability in each case in the direction of arrows $P_1$ and $P_2$. The eccentric arrangement of the additional teeth results in a radial force component arising from the circumferential force of the torque. This force must be compensated by the stability of the individual structural parts, since, otherwise, deformation may occur and the intermediate disk 76h may be jammed.

The toothings 90h, 92h may also be provided without the projections 74h, 84h.

Figure 21:
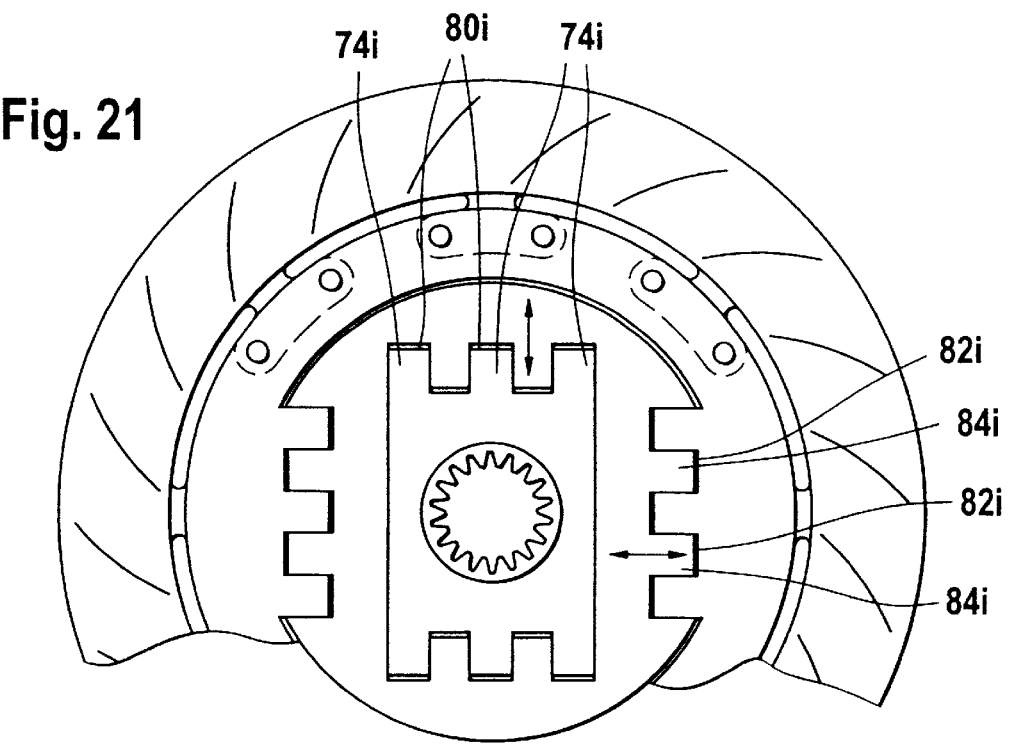
FIG. 21 shows a further modification of the clutch disk shown in FIG. 16.

A further modification is shown in FIG. 21, in which not only the individual projections 74i, 84i and the associated recesses 80i, 82i are provided, but, in each case, a plurality of such projections 74i, 84i are provided. The number of recesses 82i, 80i is also correspondingly increased. The surface pressure can also be reduced in this way.

It may be pointed out that the illustrated positioning of the projections and recesses is arbitrary. Thus, for example, in each case projections may also be formed on the intermediate ring and recesses on the other components or projections may be provided radially inward and recesses radially outward on the intermediate ring, and vice versa; this can already been seen in the embodiment according to FIG. 21.

FIG. 22 shows a further embodiment of a clutch disk 10k according to the invention. In the clutch disk 10k, the driving disk 18k is divided in two, that is to say it has two disk parts 94k, 96k which are connected to one another in their radially outer regions by means of bolts 97k, with the lining springing or a lining carrier 36k being interposed. Radially inwardly, the two disk parts 94k, 96k are at an axial distance from one another and between them receive a hub flange 98k which is connected fixedly in terms of rotation to the hub 12k, for example welded to the latter. The hub flange 98k has, distributed in the circumferential direction, a plurality of orifices 100k, through which pass bolts 102k fixedly connecting the two disk parts 96k, 94k radially inwardly. In particular, the diameter of the orifices 100k is larger than the outside diameter of the bolts 102k in the region located in the orifices 100k. Furthermore, arranged between the hub flange 98k and the disk part 94k is an elastomeric material layer 104k which is held under prestress by the bolts 102k. If wobbling movements or an axial offset occur to a lesser extent, by virtue of the movability of the bolts 102k in the orifices 100k; the driving disk 18k can be displaced to a small extent with respect to the hub 12k as a result of the elastic deformation of the elastomeric layer 104k. If these movements become more pronounced, the static friction state is overcome and the driving disk 18k can be displaced further, at the same time with a sliding movement of the elastomeric layer 104k and the hub flange 100k. If very high torques are transmitted, the bolts 102k come to bear on the circumferential wall of the orifices 100k, so that, in this state, direct torque transmission, missing out the elastomeric material, is provided, and excessive load in this region can be avoided. Since there is no movement play here, but, instead, a prestress is always generated by the elastomeric material 104k, the occurrence of rattling noises is avoided.

Although not illustrated in FIG. 22, it is, of course, also possible to arrange an elastomeric layer on both sides, that is to say also between the disk part 96k and the hub flange 98k. It is possible, furthermore, for the hub 12k to be designed in one piece with the hub flange 98k.

Since the point of articulation is located very far inward, low rigidity of the clutch disk 10k can be implemented here, while the rigidity may be influenced by the thickness and shaping of the individual disk parts or the choice of the elastomeric material. Furthermore, a design which is virtually symmetric in the axial direction and which results in uniform load on the various components is provided.

FIG. 23 shows a further embodiment of the clutch disk 101 according to the invention, which is illustrated, here, in conjunction with a dual-mass flywheel 1061 of known design. The clutch disk 101, shown here likewise in conjunction with the transmission input shaft 1081, has, once again, a driving disk 181 which again has, on the radially inner cylindrical portion, an internal toothing 461 which meshes with the external toothing 441 of the hub 121 so as to provide radial and circumferential movement play 481. Furthermore, a torsional vibration damper 1101 is provided. The vibration damper 1101 comprises a flange 1121 which is fixedly connected to the hub 121 and which is surrounded on its axial sides by the driving disk 181, on the other hand, and by a cover disk part 1141 fixedly connected to the latter, on the other hand. Respective spring apertures with control edges 1161, 1181, 1201 for the springs 1221 of a damping spring arrangement are provided in the flange 1121, the driving disk 181 and the cover disk part 1141. The springs 1221 extend approximately in the circumferential direction in a manner known per se. The torsional vibration damper 1101 may be an idling damper which, when low torques are introduced, allows relative rotatability between the driving disk 181 and the hub 121 to a predetermined extent under the compression of the springs 1221. In order, then, also to allow the radial movability or tiltability of the driving disk 181 with respect to the hub 121, the following measures may be taken.

1. The control edges 1161, 1201 of the driving disk 181 and of the cover disk part 1141 are, in the direction of their approximately radial extent, of a length such that, when relative displacement occurs between the driving disk 181 and the hub 121, the springs 1221 can be displaced along these control edges 1161 or 1201 and at the same time are fixed, for example, to the control edge 1181;
2. The control edge 1181 is, in its direction of approximately radial extent, of a length such that, when the relative displacement referred to occurs, the springs 1221 can be displaced on this control edge 1181;
3. Both the control edges 1161 and the control edges 1201 are, in the direction of their extent, of a length such that the springs 1221 can be displaced on these in each case in the radial direction or approximately radial direction, when the driving disk 1181 is displaced in the radial direction or with the effect of a tilting movement with respect to the hub 121.

It can be seen that no additional components have to be provided in order to make this radial displacement or the wobbling movement possible. This is made possible solely by virtue of the design of the respective control edges of the torsional vibration damper 1101.

The embodiment illustrated is particularly advantageous, since, with it, the relative movements referred to can occur or be made possible in the range of low load or low torques. Movements of this kind are to be expected particularly in this range of low torques; at higher torques, the clutch disk generally centers itself, or the frictional forces then occurring are so high that relative movement cannot occur. Thus, particularly in this critical range of low torques, the occurrence of wear in the region of various components can be ruled out or at least markedly reduced. Also, transmission rattle during idling can be avoided or at least markedly reduced by a suitable design of the damper characteristic curve.

Figure 24:
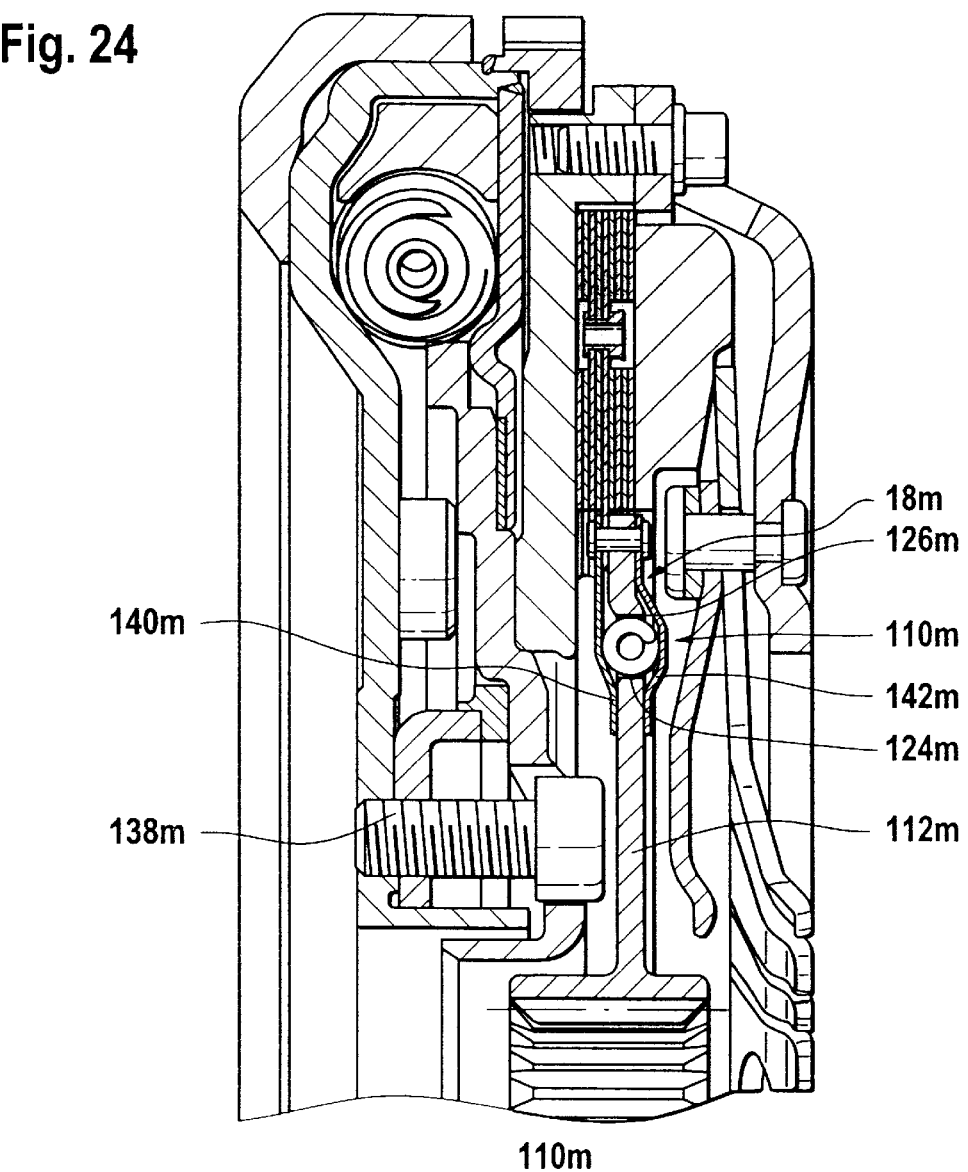
FIG. 24 shows a clutch which contains a further embodiment of a clutch disk according to the invention.
Figure 25:
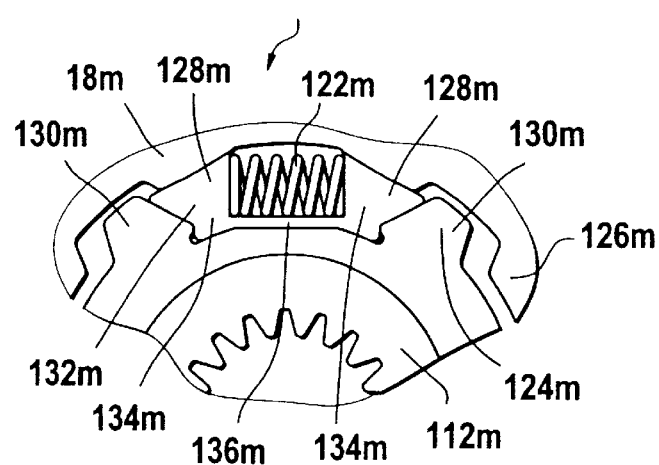
FIG. 25 shows an axial part view of the clutch disk of FIG. 24 in the region of the torsional vibration damper.

FIGS. 24 and 25 show a modification, in which the torsional vibration damper 110m is no longer located in the radially inner region, but now in the radially outer region and, furthermore, is integrated directly into the axial region of the driving disk 18m or of the hub flange 112m. The hub flange 112m has an external toothing 124m, with which an internal toothing of the driving disk 18m again meshes, in such a way that movement play both in the radial and in the circumferential direction is provided. This may be seen, in particular, in the illustration of FIG. 25. It may be stated, here, that the parts 18m and 112m form a driving disk divided in two.

The springs 122m of the torsional vibration damper 110m are arranged in the circumferential direction in each case between two teeth 128m of the toothing 126m or are clamped between these teeth. In this region, no tooth of the external toothing is provided on the hub or on the hub flange 112m. For support on the teeth 130m of the external toothing 124m, a driving element 132m is provided, which is designed symmetrically in the axial direction, only the portions located on the one axial side being apparent in FIG. 25. The driving element 132m comprises, on both sides of the springs 122m, in each case funnel-shaped driving tabs 134m which are supported on the springs 122m on both sides of the driving disk 18m and which, furthermore, are supported on the teeth 130m of the external toothing 124m by means of axially bent tabs which cannot be seen. These driving tabs 134m are connected by means of a connecting web 136m running radially within the springs 122m. When relative rotation occurs between the hub flange 112m and the driving disk 18m, the springs 122m are directly supported, in one of their end regions, on a tooth 128m of the internal toothing 126m and, in their other end region, on a tooth 130m of the external toothing 124m via the associated driving tabs 134m of the driving element 132m.

This embodiment, too, makes it possible, again, to have the relative displaceability in the radial direction and a wobbling movement, while, in order to make this movement easier, the individual toothings may be designed with a convex surface shape of the teeth 128m or 130m.

Furthermore, there are provided on the disks 18m centering springs 140m, 142m which center the disks axially with respect to the hub flange 112m.

The embodiment illustrated in FIGS. 24 and 25 is advantageous particularly when only a little axial construction space is available, in particular when there are to be provided in the inner region of the clutch disk passage orifices, through which are to be led the screws 138m which can be seen in FIG. 24 and by means of which a flywheel is to be screwed to a crankshaft.

Figure 26:
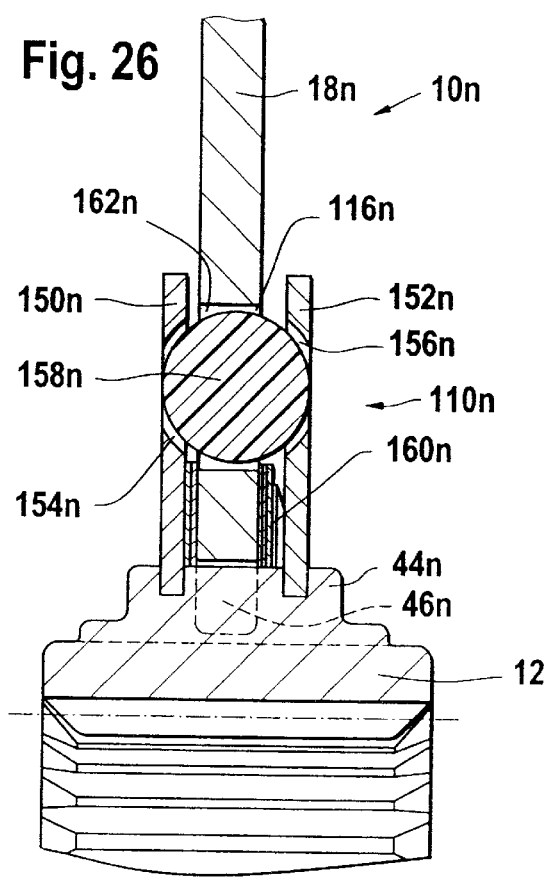
FIG. 26 shows a longitudinal section, showing a further embodiment of a clutch disk according to the invention.

FIG. 26 shows a further embodiment of a clutch disk 10n according to the invention. The driving disk 18n and the hub 12n are in each case again in engagement via toothings 46n, 44n, and, as also described above, circumferential movement play and radial movement play are provided between these toothings. Fixedly connected to the hub 12n are cover disks 150n, 152n which have respective apertures with control edges or bearing regions 154n, 156n. The driving disk 18n has, assigned to these apertures, an orifice 162n which, again, forms respective control edges 116n or bearing regions. Provided so as to be assigned to each set of control edges or bearing regions 154n, 156n, 116n, that is to say to the orifices forming these regions, is an elastic element 158n which, by virtue of its elastic deformability, allows a relative circumferential movement between the driving disk 18n and the cover disks 150n, 152n and therefore the hub 12n, and, furthermore, by virtue of its elasticity, allows radial displaceability of the driving disk 18n with respect to the hub 12n or tilting with the effect of a wobbling movement.

The elastic elements 158n may, for example, be formed by springs extending approximately in the circumferential direction, in which case, as referred to above, specific displaceability in the radial direction may be provided here in the region of the respective control edges 154n, 156n, 116n, or the elastic elements 158n may be, for example, solid bodies formed, for example, from rubber of from another elastically deformable material. It is possible, for example, for the elastic elements 158n to be of spherical design and for the bearing regions 154n, 156n to be formed by correspondingly spherical or dome-like surface regions, on which the respective spherical elements 158n are held both in the circumferential direction and in the radial direction. Here too, as illustrated in FIG. 26, relative movability may be made even easier by the provision of a specific interspace between the elastically deformable elements 158n and the bearing regions.

The embodiment illustrated is effective, particularly in a load range of up to approximately 50 Nm in the circumferential direction, as a torsional vibration damper which both can balance out axial offsets and allows wobbling movements. This is a load range which occurs in the idling mode and in the part-load mode. At higher torques, there is positive rotational coupling in the circumferential direction via the toothings 44n, 46n. The relative movability between the toothings 44n, 46n in the axial direction and in the radial direction is maintained due to the movement play which continues to exist in these directions. This means, ultimately, that, even when the torsional vibration damper 110n is bridged by the toothings 44n, 46n butting one against the other, balancing out of an axial offset, by allowing wobbling movements, continues to be possible. Since, in this case, the toothings 44n, 46n bearing one on the other are subjected to high load, it is advantageous for at least the toothing 44n on the hub to be hardened inductively or given wear protection treatment in another way, for example covered with a sliding material layer.

It can also be seen, in FIG. 26, that a friction device 160n with respective friction elements on both sides of the driving disk 18n and with a prestressing spring is provided. If this friction device 160n is provided, it is necessary to ensure that it does not impair radial displaceability and wobbling movability. By suitable choice of a plurality of elastically deformable elements which are arranged so as to be distributed in succession in the circumferential direction, it is possible to provide a multistep characteristic curve of this torsional vibration damper 110n, said curve also containing an idling damper region. The elastically deformable elements may, however, also be configured in such a way that only an idling damper function is provided.

Instead of the spherical shape referred to, it is also possible to provide cylindrical shapes for the individual elastic bodies or to design a plurality of elastic bodies, arranged so as to be distributed in the circumferential direction, with different shapes.

It may be pointed out that, by an appropriate choice of the elasticity of the elements 158n, the embodiment illustrated in FIG. 26 may be designed essentially only for the function of allowing the wobbling movement or of compensating an axial offset, without the additional provision of a torsional vibration damper function.

It may be pointed out that various types of springs may be used in the torsional vibration dampers illustrated, so that a stepped damping function is obtained; furthermore, a frictional device may be provided, which contributes to damping when a relative movement, in particular relative rotation, occurs.

Figure 26A:
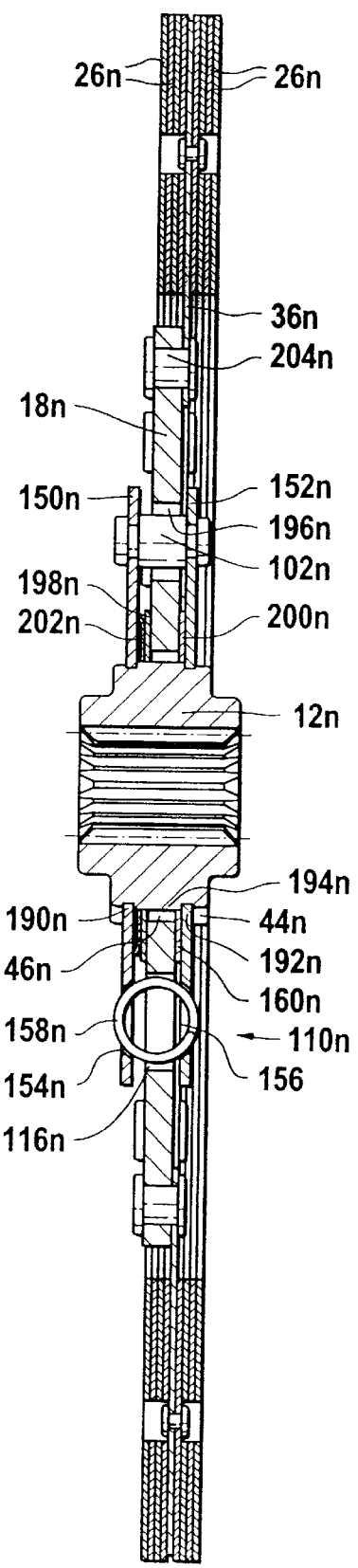
FIG. 26a shows a modification of the embodiment illustrated in FIG. 26.
Figure 26B:
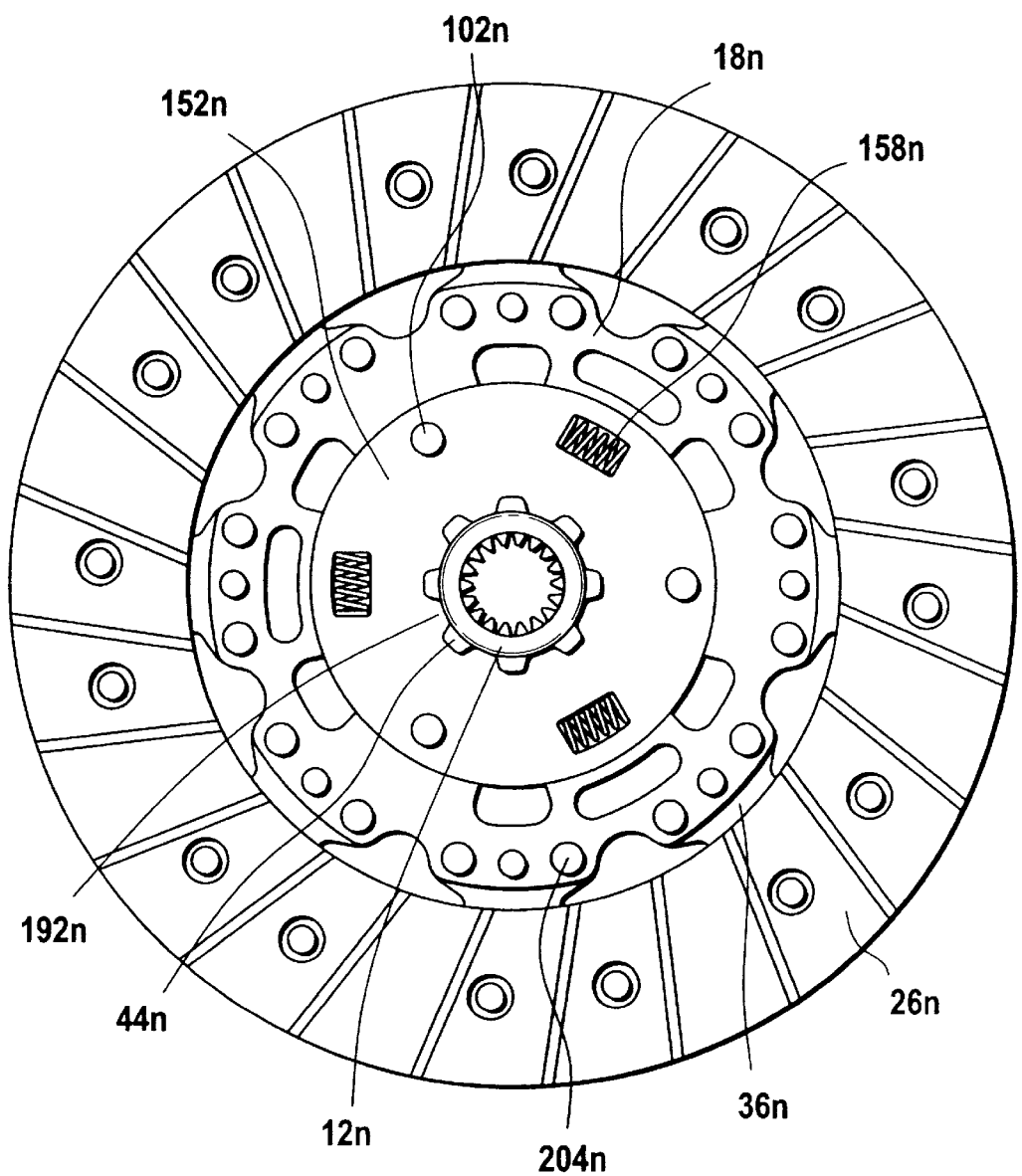

FIGS. 26a and 26b show a modification of the embodiment illustrated in FIG. 26. Whereas, in the embodiment according to FIG. 26, the two cover disks 150n, 152n were fixedly connected to the hub 12n, for example by caulking, in the embodiment according to FIGS. 26a and 26b there is provision for the two cover disks 150n, 152n each to have, in their radially inner region, a toothing configuration 190n, 192n which is complementary to the toothing 44n of the hub 12n. That is to say, the toothings 190n, 192n mesh with the toothing 44n so as to be free of play essentially both in the radial direction and in the circumferential direction. Provided in the region of the toothing 44n, on the hub 12n, is a radial step or a radial projection region 194n, on which the two cover disks 150n, 152n butt in the region of their toothings 190n, 192n. That is to say, the projection region 194n is held axially between the two cover disks 150n, 152n. In the radially outer region, the cover disks 150n, 152n are fixedly connected to one another by means of riveted bolts 102n or the like which pass through corresponding orifices 196n in the driving disk 18n. Here, therefore, the two cover disks 150*n*, 152*n* holding the projection region 194*n* between them have a closed force loop and the subassembly formed from the cover disks 150*n*, 152*n* is thus fixed axially with respect to the hub 12*n*. This type of axial fixing of the cover disks 150*n*, 152*n* to the hub 12*n* has a design which is subjected to less load, particularly when wobbling movements occur, as compared with the embodiment according to FIG. 26. This constitutes a solution capable of being produced very cost-effectively, since, as described above, the closed force loop between the two cover disks 150*n*, 152*n* takes place in their radially outer region. This is highly advantageous for the durability of a connection of this kind.

FIG. 26*a* also shows the friction device 160*n* with the two friction rings 198*n*, 200*n* bearing on the driving disk 18*n*, a prestressing element, for example in the form of a cup spring 202*n*, acting between the cover disk 150*n* and the friction ring 198*n*. It may be pointed out, once again, that any design of a friction device may be used here. In the radially outer region, the friction linings 26*n* are again carried on lining carriers, such as, for example, lining springs 36*n*, by riveting. These lining carriers or lining springs 36*n* are fixedly connected to the driving disk 18*n* by means of a plurality of bolts 204*n*.

Furthermore, FIG. 26*a* and FIG. 26*b* show that, here, the elastic elements used may be springs 158*n* which are supported in the circumferential direction on the respective control edges 154*n*, 156*n*, 116*n* of the cover disks 150*n*, 152*n* or of the driving disk 18*n*. It should be pointed out that, here too, a multistep damper may be formed by assigning to each group of control edges 154*n*, 116, 156*n*, successively in the circumferential direction, a plurality of springs 158*n* which can then have different spring characteristics, so that, in the first place, only the softer springs are compressed, for example in order to form an idling damper function, and then, when these are compressed completely or virtually completely, the harder springs become effective. For this purpose, there may be provided in each case between springs succeeding one another in the circumferential direction a supporting or sliding element which, for example, can slide on an inner circumferential surface of the driving disk 18*n* in the circumferential direction. The control edges 154*n*, 156*n*, 116*n* are designed so that, when wobbling movements occur, they allow at least slight radial and/or axial displacement of the elastic elements 158*n*, along these control edges. Since, in this embodiment too, beyond a load of approximately 50 Nm, the toothings 44*n*, 46*n* bear one on the other and the compensation of wobbling movements by surfaces of the toothings 46*n*, 44*n*, said surfaces sliding one on the other, continues to be possible in the axial and radial directions, it is advantageous, here too, to harden at least the hub 12*n* in the region of its toothing 44*n*, for example by inductive hardening, or to coat it with wear protection, for example a sliding layer.

Figure 27:
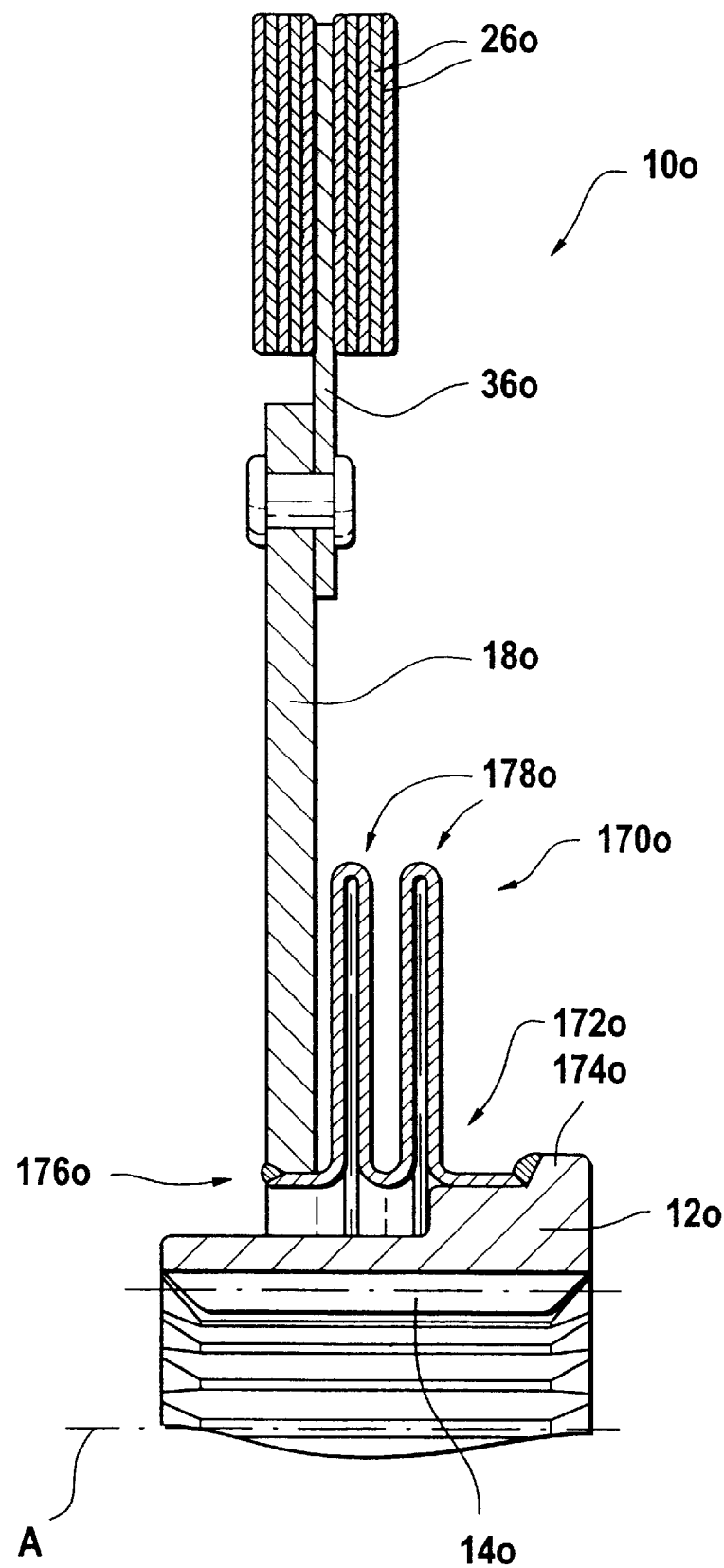
FIG. 27 shows a partial longitudinal section of a further embodiment of a clutch disk according to the invention with coupling bellows.

A further embodiment of a clutch disk 10*o* according to the invention is illustrated in FIG. 27. In this clutch disk, too, the friction linings 26*o* are once again connected fixedly in terms of rotation to the driving disk 18*o* radially outwardly via the lining carrier 36*o*, if appropriate with lining springing being interposed or with lining springs being provided by the lining carrier 36*o*. Torque transmission between the driving disk 18*o* and the hub 12*o* of the clutch disk 10*o* is provided, here, by a coupling bellows 170*o*. The coupling bellows 170*o* surrounds the rotation axis A approximately concentrically and, in a first end region 172*o*, for example in a region of a radial shoulder 174*o* of the hub 12*o*, is fixedly connected to the hub 12*o* by welding, or the like. In its second axial end region 176*o*, the coupling bellows 170*o* is fixedly connected to the driving disk 18*o* by welding. In this case, the coupling bellows 170*o* forms respective cylindrical end portions in its two axial end regions 172*o*, 176*o*. The cylindrical end portion provided in the first axial end region 172*o* is fitted onto an outer circumferential surface of the hub 12*o*, and the cylindrical end portion of the coupling bellows 170*o* provided in the second axial end region 176*o* engages into a central orifice of the driving disk 18*o*, so that the driving disk 18*o* is seated with its inner circumferential surface on this end region of the coupling bellows 170*o*.

By means of the coupling bellows 170*o*, which has two bellows folds 178*o* in the embodiment illustrated, when the clutch is engaged, that is to say when the friction linings 26*o* are clamped between a flywheel and a pressure plate, an axial offset, for example between a transmission input shaft and a drive shaft of an engine, can easily be compensated, without any constraints occurring. Particularly when a coupling bellows 170*o* is designed as a metal bellows, in addition to the high torque transmission capacity and a low dead weight in the region of this coupling bellows 170*o* a virtually fatigue-free radially and axially elastic coupling of the friction linings 26*o* to the hub 12*o* is provided.

The connection of the coupling bellows 170*o* to the hub 12*o* and/or to the driving disk 18*o* may of course be made in a way other than by welding. For example, it would be conceivable for the coupling bellows 170*o* and, correspondingly, the components 12*o* and 18*o* to be coupled to the bellows to be designed in each case with a nonrotationally symmetric cross section in the respective end regions 172*o*, 176*o*, so that positive engagement of the various components one on the other is produced, here, in the circumferential direction. It is also obvious that the bellows may have more than only the two folds illustrated or, if appropriate, may also have only a single bellows fold 178*o*. The coupling of the coupling bellows 170*o* to the hub 12*o*, like the coupling of the bellows 170*o* to the friction linings 76*o*, may take place, with a driving element being interposed. It can be seen that the use of a coupling bellows, as illustrated in FIG. 27, may, of course, be combined with other embodiments described above, which provide axially and radially elastic coupling of the friction linings to the hub.

It is also possible to make the connection between the friction linings 26*o* and the hub 12*o* by means of a plurality of bellows 170*o* arranged in a staggered manner, these being coupled to one another, for example in their end regions, if appropriate with connecting elements being interposed, and, where appropriate, being capable of having different dimensions in the radial and axial directions or different bellows configurations. In this case, one end of each bellows is then always provided for coupling to the hub, if appropriate with at least one further bellows being interposed, and another end of the bellows is provided for coupling to the friction linings, if appropriate with at least one further bellows being interposed.

Embodiments of clutch disks were described above, which, when a drive system is in operation, can compensate axial offsets possibly existing between the transmission input shaft and the crankshaft, and which allow wobbling movements generated as a result of the untrue running of at least one of these shafts or because these shafts are not aligned exactly in parallel. Various concepts were shown, which, on the one hand, contain the elastic deformability of various components and, on the other hand, the relative movability of individual structural parts with respect to one another, and the respective concept may be selected so as to be adapted to the loads and requirements occurring during operation.

It may be pointed out, furthermore, that the measures specified for compensating an axial offset or for allowing the wobbling movement may likewise be integrated into a dual-mass flywheel.

The invention is not limited by the embodiments described above which are presented as examples only but can be modified in various ways within the scope of protection defined by the appended patent claims.

What is claimed is:

1. A clutch disk for a motor vehicle friction clutch, comprising:
    a hub couplable fixedly in terms of rotation to a transmission input shaft;
    friction linings in a radially outer region of the clutch disk, the friction linings lying, at least partially, one of essentially parallel to and in one plane which is essentially orthogonal to a hub rotation axis; and
    connecting means for connecting the friction linings to the hub so that the friction linings can execute at least one of a radial movement with respect to the hub rotation axis and a tilting movement with respect to the plane, the connecting means including a torsional vibration damper arranged in a torque transmission path between the hub and the friction linings and having an input side and an output side, the input side and the output side being displaceable in at least one of the radial direction and the axial direction with respect to one another and at least one of the input side and the output side being tiltable with respect to the plane and to the other side, the connecting means including a driving disk with a radially outer disk part and a radially inner disk part with an external toothing, the radially outer disk part having an internal toothing which meshes with the external toothing on the radially inner disk part with relative movement play in the radial direction and in the circumferential direction, the torsional vibration damper including a spring arrangement with at lest one spring which is arranged in a region of the intermeshing toothings and which can be supported, in its end regions, on the external toothing and on the internal toothing.

2. The clutch disk as defined in claim 1, wherein the torsional vibration damper is arranged in the radially outer region of the driving disk.

3. The clutch disk as defined in claim 1, wherein the at least one spring is configured for idling conditions so that under drive conditions the damper uncouples rotational vibrations.

* * * * *